(12) United States Patent
Ragias et al.

(10) Patent No.: US 11,613,414 B2
(45) Date of Patent: Mar. 28, 2023

(54) LID ASSEMBLY FOR A CONTAINER

(71) Applicant: Oneida Consumer, LLC, Columbus, OH (US)

(72) Inventors: Christos Argirios Ragias, Columbus, OH (US); Garet Riley Miller, Chillicothe, OH (US); Brian J. Demers, Charlotte, NC (US)

(73) Assignee: ANCHOR HOCKING, LLC, Columbus, OH (US)

( * ) Notice: Subject to any disclaimer, the term of this patent is extended or adjusted under 35 U.S.C. 154(b) by 95 days.

(21) Appl. No.: 17/228,605

(22) Filed: Apr. 12, 2021

(65) Prior Publication Data
US 2021/0229877 A1    Jul. 29, 2021

Related U.S. Application Data

(63) Continuation-in-part of application No. 16/363,689, filed on Mar. 25, 2019, now Pat. No. 10,974,874.

(60) Provisional application No. 62/754,185, filed on Nov. 1, 2018.

(51) Int. Cl.
*B65D 45/20*     (2006.01)
*B65D 43/02*     (2006.01)

(52) U.S. Cl.
CPC .......... *B65D 45/20* (2013.01); *B65D 43/0212* (2013.01); *B65D 2205/02* (2013.01); *B65D 2543/00231* (2013.01); *B65D 2543/00555* (2013.01)

(58) Field of Classification Search
CPC .. B65D 73/005; B65D 73/0014; B65D 67/00; B65D 47/32; B65D 33/01; B65D 5/6611; B65D 2251/1058; B65D 45/20; B65D 43/0212; B65D 2205/02; B65D 2543/00231; B65D 2543/00555; B65D 51/1683; B65D 45/32
See application file for complete search history.

(56) References Cited

U.S. PATENT DOCUMENTS

| | | | | |
|---|---|---|---|---|
| 7,997,439 | B2* | 8/2011 | Meeks | C08L 83/04 220/573.2 |
| 8,714,394 | B2* | 5/2014 | Wulf | B65D 43/02 220/784 |
| 8,729,438 | B2* | 5/2014 | Iwasaki | B65D 81/34 219/730 |
| 8,733,550 | B2* | 5/2014 | Harvey | B65D 41/16 206/508 |
| 2002/0092787 | A1* | 7/2002 | Cheng | B65D 11/1893 206/278 |
| 2009/0008284 | A1* | 1/2009 | Lown | B65D 45/20 220/788 |
| 2010/0200588 | A1* | 8/2010 | Bergman | B65D 81/2038 220/203.01 |
| 2012/0024856 | A1* | 2/2012 | Smyers | A47G 19/02 220/345.6 |

(Continued)

*Primary Examiner* — Kareen K Thomas
(74) *Attorney, Agent, or Firm* — Tucker Ellis LLP

(57) ABSTRACT

Provided is a lid assembly for a container. The lid assembly includes a lid formed of a first material and a seal formed of a second material and being integrally formed with the lid. The lid can be attached to the container such that a radially outwardly extending flexible lip of the seal compresses against an inner surface of the container to seal the lid assembly to the container.

19 Claims, 30 Drawing Sheets

(56) References Cited

U.S. PATENT DOCUMENTS

| | | | |
|---|---|---|---|
| 2012/0248116 A1* | 10/2012 | Smyers | B65D 53/02 220/324 |
| 2012/0267369 A1* | 10/2012 | Duvigneau | B65D 43/0204 220/795 |
| 2013/0233854 A1* | 9/2013 | Smyers | B65D 43/02 220/240 |
| 2015/0136786 A1* | 5/2015 | Lonner | B65D 21/086 220/529 |

* cited by examiner

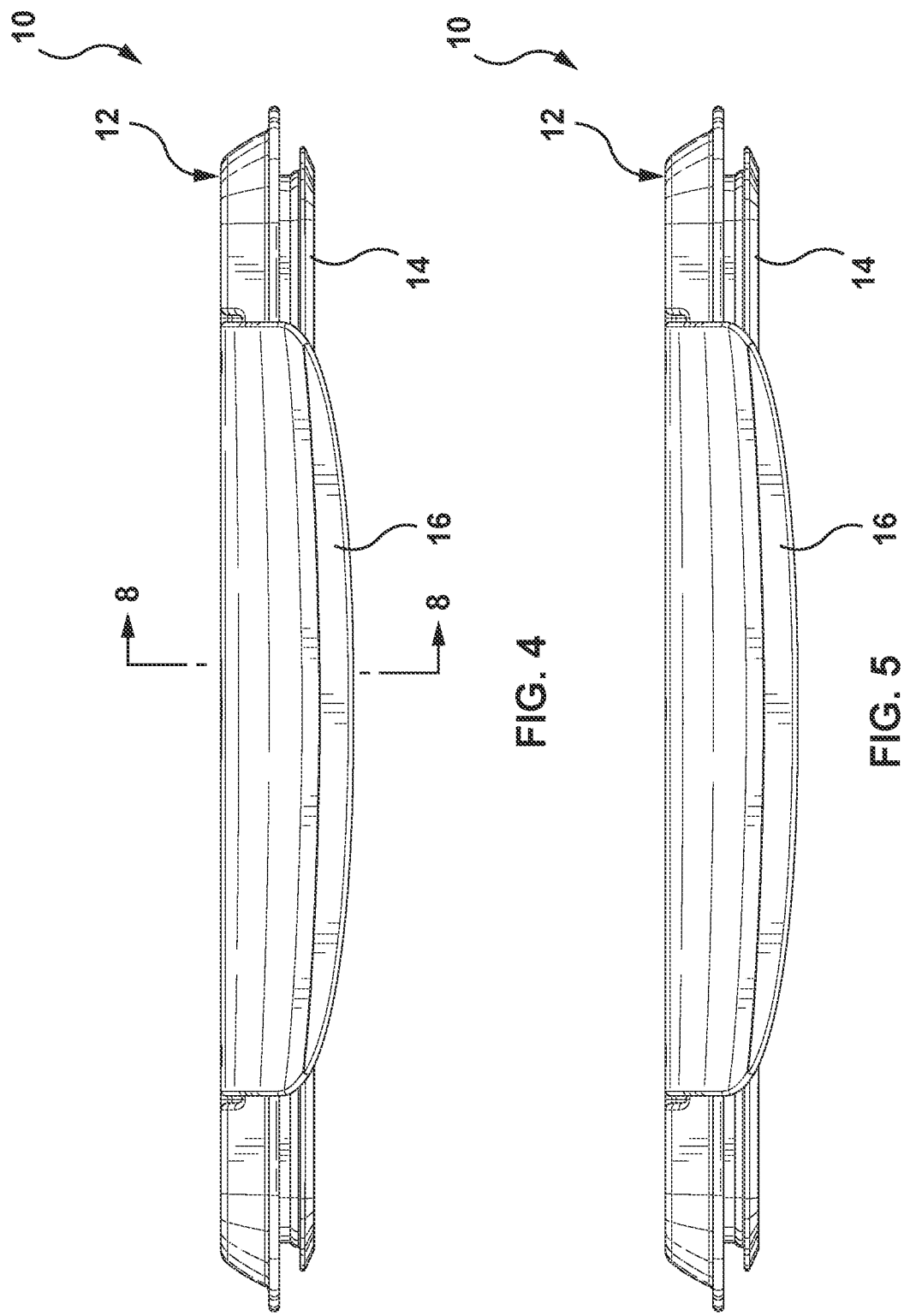

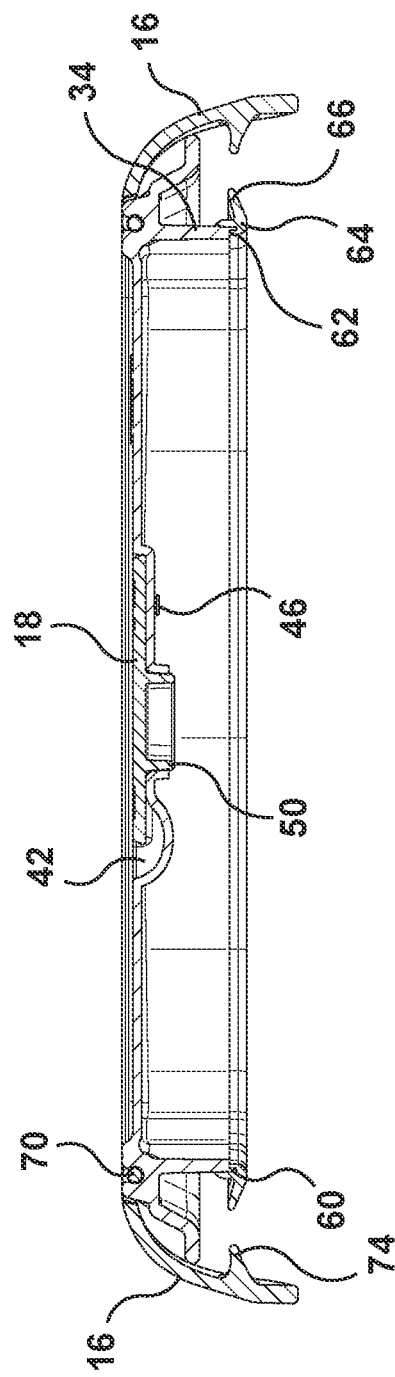
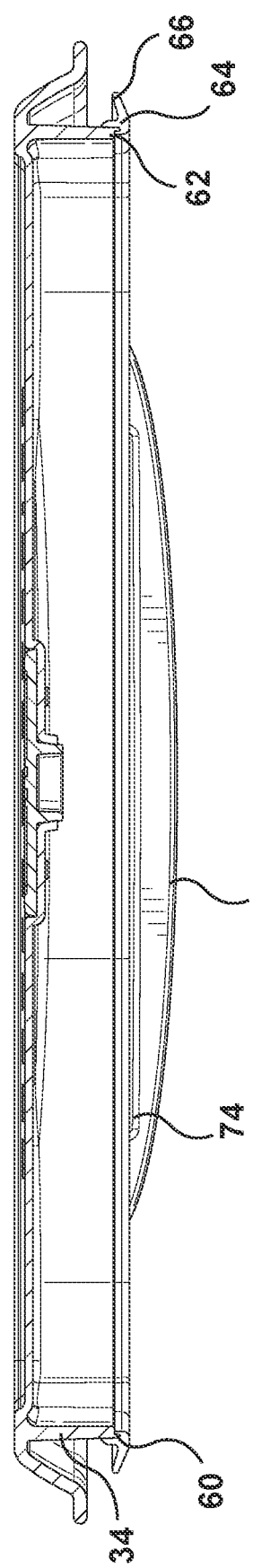

LID ASSEMBLY FOR A CONTAINER

RELATED APPLICATION DATA

This application is a continuation in part of U.S. patent application Ser. No. 16/363,689 filed Mar. 25, 2019, which claims the benefit of and priority to U.S. Provisional Application No. 62/754,185 filed Nov. 1, 2018, which is hereby incorporated herein by reference.

TECHNICAL FIELD

In general, the present invention relates to a lid assembly, and in particular to a lid assembly for a reusable container.

BACKGROUND OF THE INVENTION

Containers for holding food can include a removable lid to allow for storage of the container and for containing contents of the container during heating.

SUMMARY OF THE INVENTION

The present application provides a lid assembly for a container. The lid assembly includes a lid formed of a first material and a seal formed of a second material and being integrally formed with the lid. The lid can be attached to the container such that a radially outwardly extending flexible lip of the seal compresses against an inner surface of the container to seal the lid assembly to the container. In this way, the lid assembly can seal to a container despite tolerances of the material of the container.

In accordance with an embodiment of the present invention, a lid assembly for a container is provided that includes a lid formed of a first material and having an upper surface, a lower surface, and a projection extending downward from and around the lower surface, a seal formed of a second material and integrally formed with and extending around the projection, the seal having a radially outwardly extending flexible lip for sealing against an inner surface of the container, and at least two flaps pivotally and removably connected to the upper surface of the lid, each flap having a radially inwardly extending clasp, wherein the at least two flaps are movable between respective closed positions where the clasps engage an underside of a lip of the container to secure the lid assembly to the container and compress the radially outwardly extending flexible lip of the seal against the inner surface of the container to seal the lid assembly to the container, and respective open positions where the clasps are disengaged from the underside of the lip of the container.

In accordance with another embodiment of the present invention, a lid assembly for a container is provided that includes a lid having an upper surface, a lower surface, a projection extending downward from and around the lower surface, and at least two pivot receptacles formed in the upper surface on opposite sides thereof, a seal integrally formed with and extending around a bottom of the projection, the seal having a radially outwardly extending flexible lip for sealing against an inner surface of the container, and at least two flaps each having at least one pivot connected to one of the at least two pivot receptacles, each flap having a radially inwardly extending clasp, wherein the at least two flaps are movable between respective closed positions where the clasps engage an underside of a lip of the container to secure the lid assembly to the container and compress the radially outwardly extending flexible lip of the seal against the inner surface of the container.

In accordance with still another embodiment of the present invention, a lid assembly for a container is provided that includes a lid formed of a first material and having an upper surface, a lower surface, a projection extending downward from and around the lower surface, and at least two pivot receptacles formed in the upper surface on opposite sides thereof, a seal formed of a second material and integrally formed with and extending around a bottom of the projection, the seal having a radially outwardly extending flexible lip for sealing against an inner surface of the container, at least two flaps formed of the second material and each having at least one pivot connected to one of the at least two pivot receptacles, each flap having a radially inwardly extending clasp, and a vent formed of the second material and removably attached to the lid, wherein the at least two flaps are movable between respective closed positions where the clasps engage an underside of a lip of the container to secure the lid assembly to the container and compress the radially outwardly extending flexible lip of the seal against the inner surface of the container.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 4 is a right side view of the lid assembly.
FIG. 5 is a left side view of the lid assembly.
FIG. 8 is a cross-sectional view taken about line 8-8 in FIG. 4.
FIG. 9 is a cross-sectional view taken about line 9-9 in FIG. 2.

DETAILED DESCRIPTION OF THE INVENTION

Figure 1:
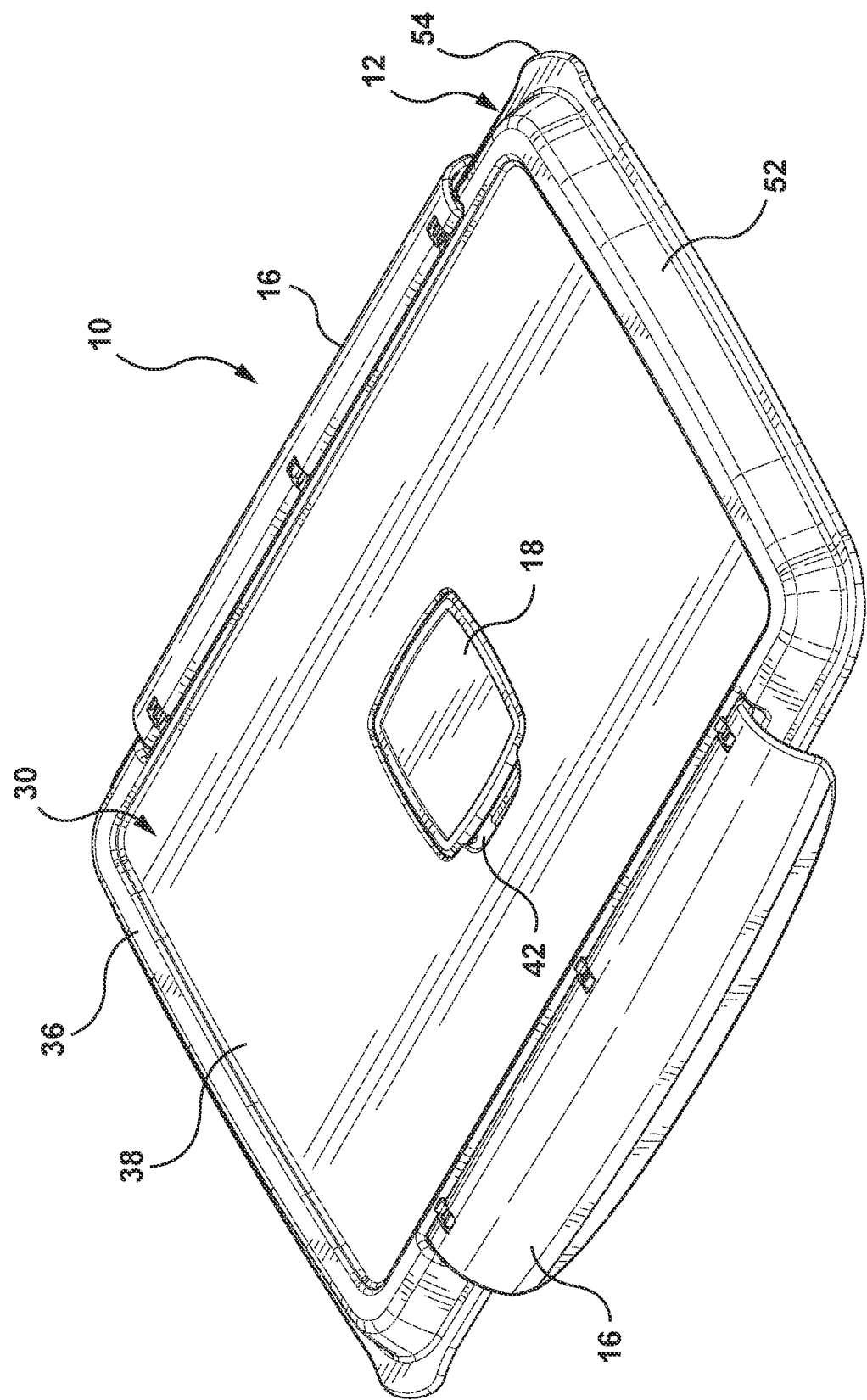
FIG. 1 is a top perspective view of an exemplary lid assembly.
Figure 2:
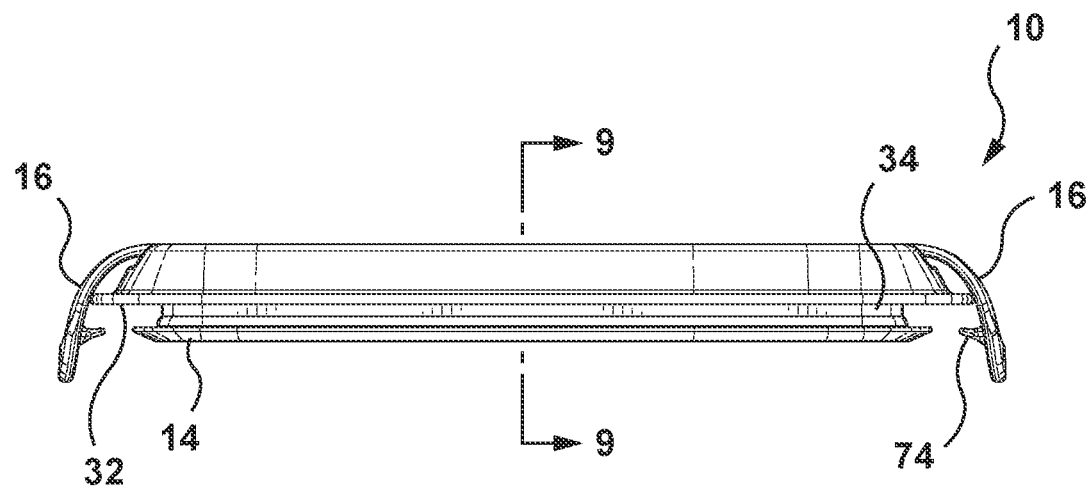
FIG. 2 is a front view of the lid assembly.
Figure 3:
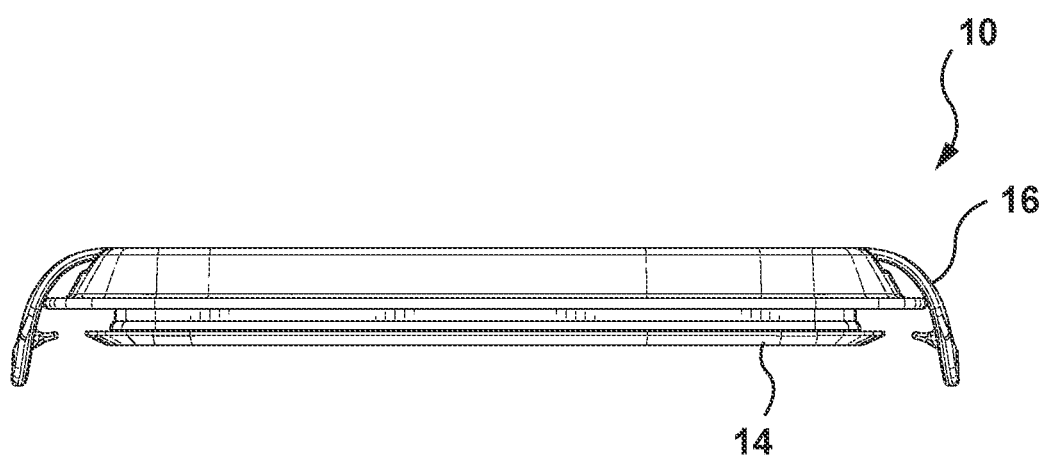
FIG. 3 is a rear view of the lid assembly.
Figure 6:
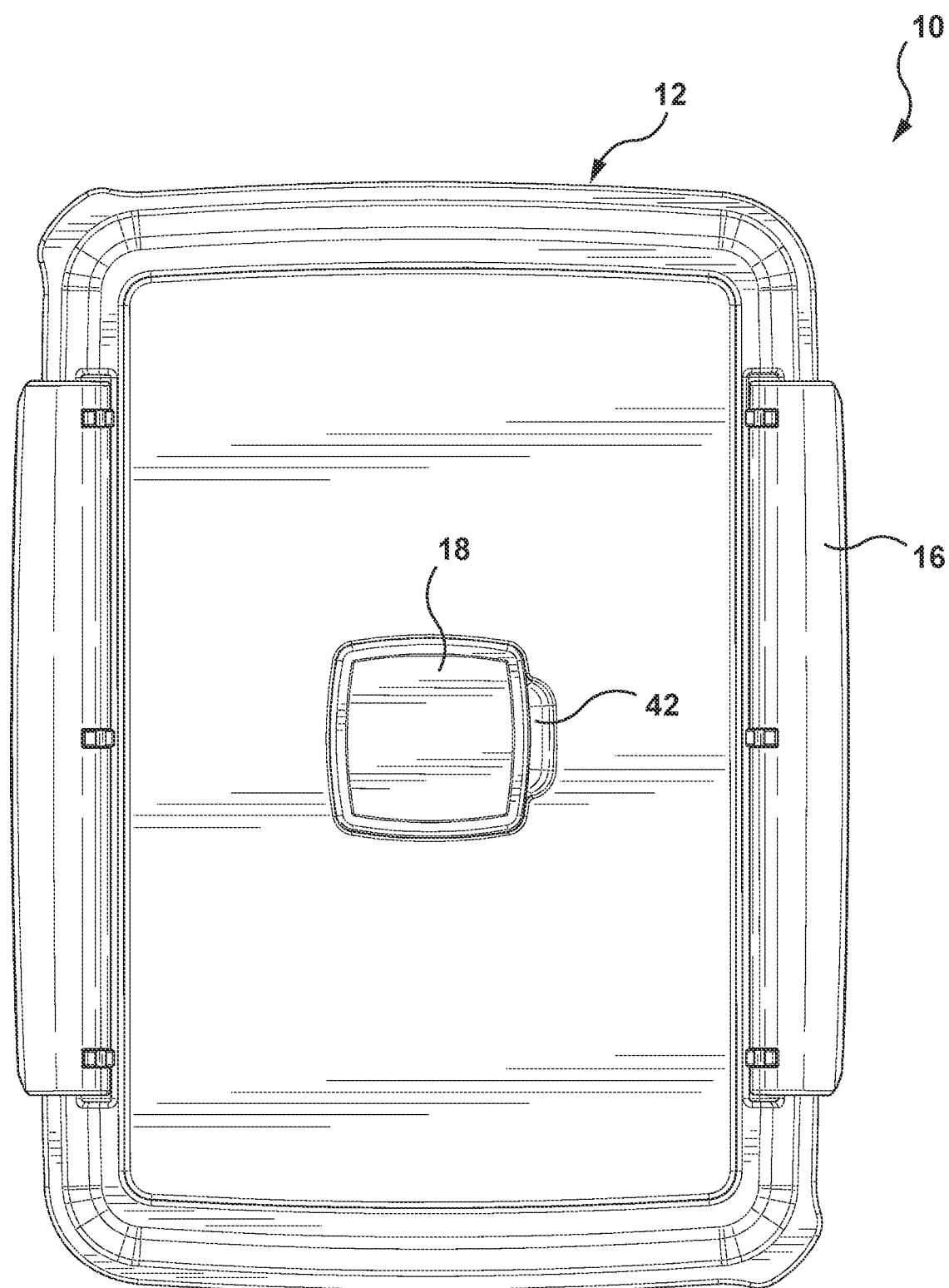
FIG. 6 is a top view of the lid assembly.
Figure 7:
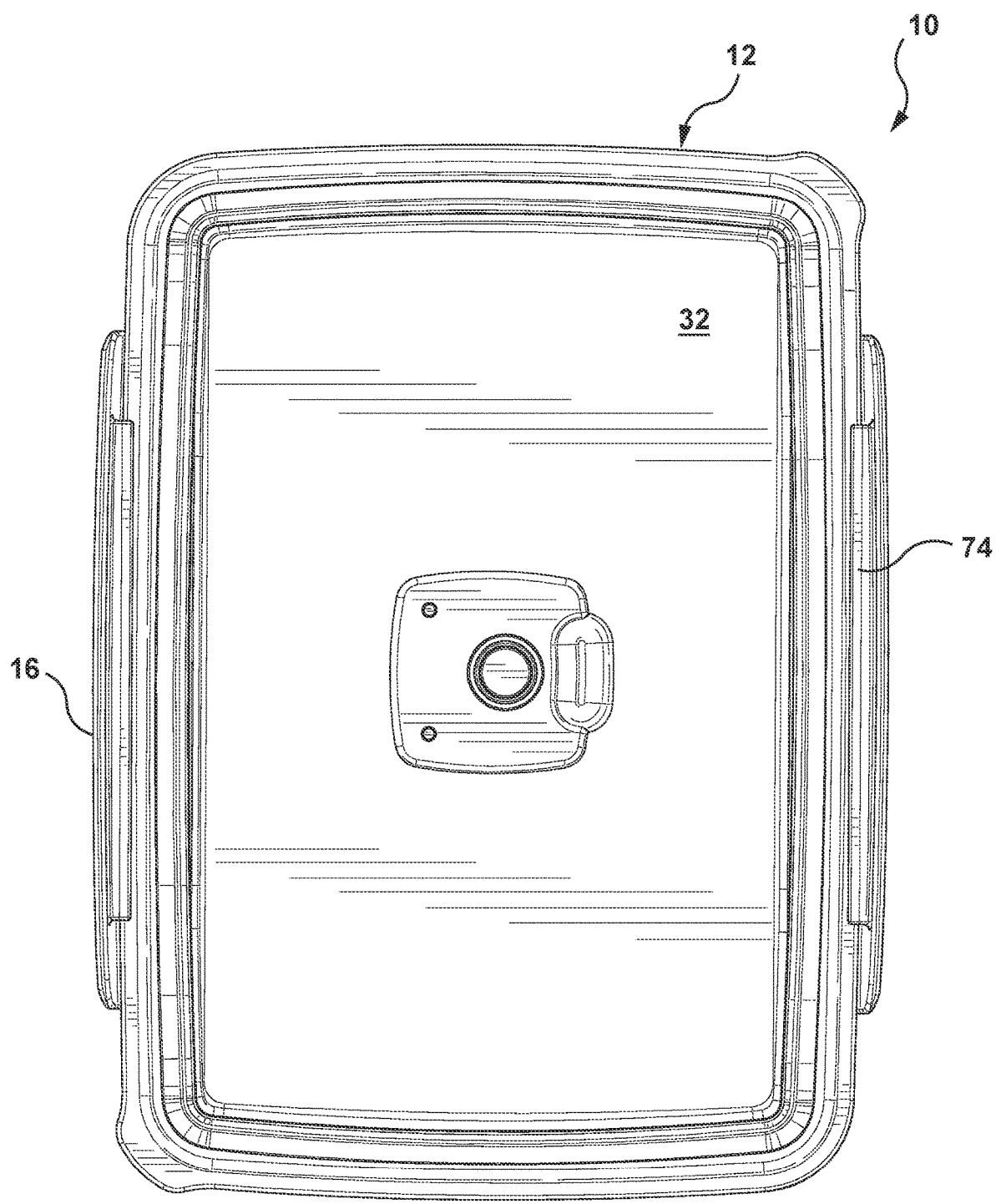
FIG. 7 is a bottom view of the lid assembly.

Embodiments of the invention relate to lid assemblies for containers including a lid having an upper surface, a lower surface, and a projection extending downward from and around the lower surface, a seal integrally formed with and extending around the projection, and at least two flaps pivotally connected to the upper surface of the lid. The at least two flaps are movable between respective closed positions where the clasps engage an underside of a lip of the container to secure the lid assembly to the container and compress a flexible lip of the seal against the inner surface of the container, and respective open positions disengaged from the underside of the lip of the container.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning initially to FIGS. 1-9, a lid assembly for attachment to a container, such as a glass container, is shown at reference numeral 10. The lid assembly 10 includes a lid 12, a seal 14 integrally formed with the lid 12, at least two flaps 16 pivotally connected to the lid 12, and a vent 18 attached to the lid 12. The lid may be any suitable size, such as one sized to attach to a nine by thirteen container. The lid 12 and flaps 16 may be made of any suitable material, such as polypropylene, and formed in a suitable manner, such as injection molding. The seal 14 and vent 18 may be made of any suitable material, such as thermoplastic elastomer (TPE), and formed in a suitable manner, such as injection molding. In an embodiment, the seal 14 may be overmolded onto the lid 12 and not removable from the lid.

Figure 10:
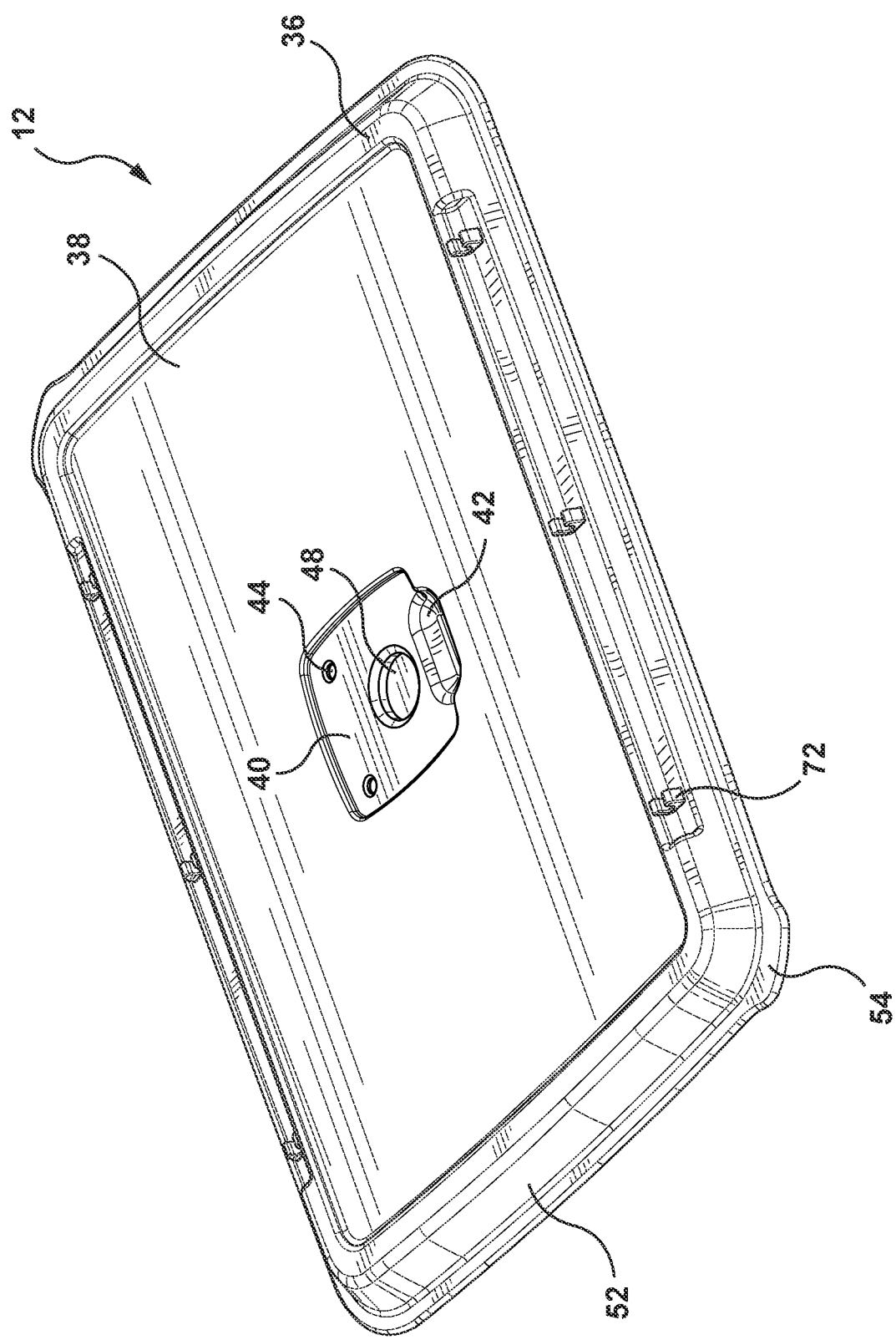
FIG. 10 is a top perspective view of a lid of the lid assembly.

Referring to FIG. 10 in addition to FIGS. 1-9, the lid 12 has an upper surface 30, a lower surface 32, and a projection 34 extending downward from and around the lower surface 32. The upper surface 30 includes a first area 36, a first recessed area 38, and a second recessed area 40 recessed relative to the first recessed area 38 for receiving the vent 18. Provided in the second recessed area is an indent 42 for a user's fingers that allows a user to grasp an underside of the vent 18, one or more openings 44 for receiving bosses 46 on the vent 18, and an opening 48 for receiving a protrusion 50 on the vent 18. The upper surface also has an edge 52 projecting downward and outward from the first area 36 to contact an upper surface of the container. The edge 52 includes one or more griping portions 54, such as two extending from opposite corners thereof, which extend beyond the upper surface of the container for a user to grasp to remove the lid.

The projection 34 extends downward from and entirely around the lower surface 32 to strengthen the lid, and the seal 14 is integrally formed with and extends entirely around the projection 34. As shown in FIGS. 8 and 9, a finger 60 projects downward from a bottom of the projection 34 and entirely around the projection 34 to define with the bottom of the projection 34 a ledge 62 inward of the finger 60 to assist in preventing separation of the seal from the projection. The seal 14 includes a body 64 integrally formed with the projection 34 and a radially outwardly extending flexible lip 66 projecting radially outwardly from the body 64 for sealing against an inner surface 84 of a container 80. The deflectable sealing lip 66 is shown in FIGS. 8 and 9 in a first position and shown deflected in FIG. 14 a second position.

Figure 11:
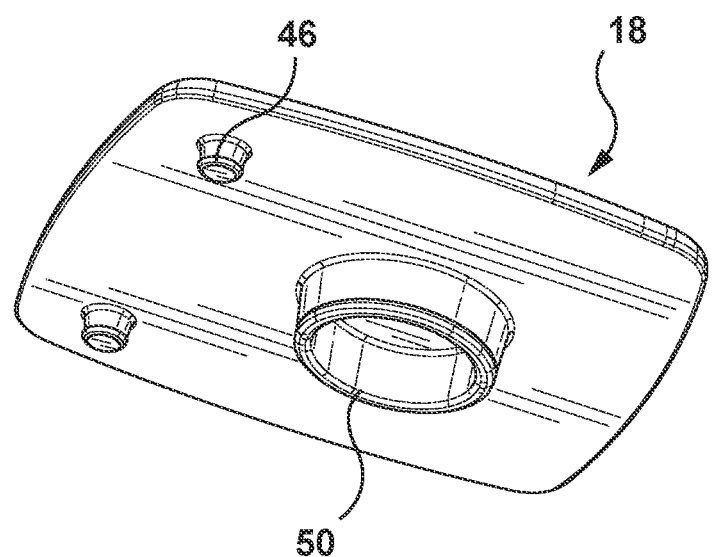
FIG. 11 is a bottom perspective view of a vent of the lid assembly.

Referring additionally to FIG. 11, the vent 18 has a substantially planar top that can be molded with indicia on it and is sized to fit within the second recessed area 40 such that a top of the vent 18 is substantially flush with the first recessed area 38. The vent 18 includes the pair of bosses 46 that are received in the openings 44 to secure the vent 18 to the second recessed area 40 of the lid and to allow the protrusion 50 to be lifted out of the opening 48 to vent air through the opening 48, such as during heating or to allow steam out of the container. The vent 18 also includes the protrusion 50 that is received in the opening 48 to also removably secure the vent 18 to the second recessed area 40. The bosses 46 and protrusion 50 also serve to seal the vent 18 to the lid 12 to minimize or prevent heat/coolness from escaping through the lid 12.

Figure 12:
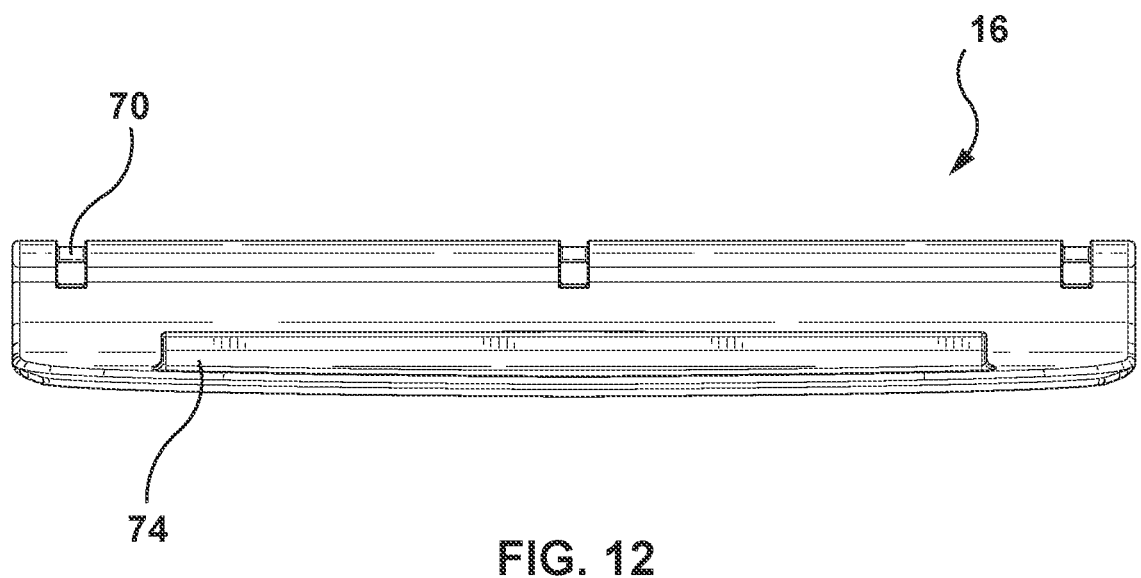
FIG. 12 is a bottom view of a flap of the lid assembly.
Figure 13:
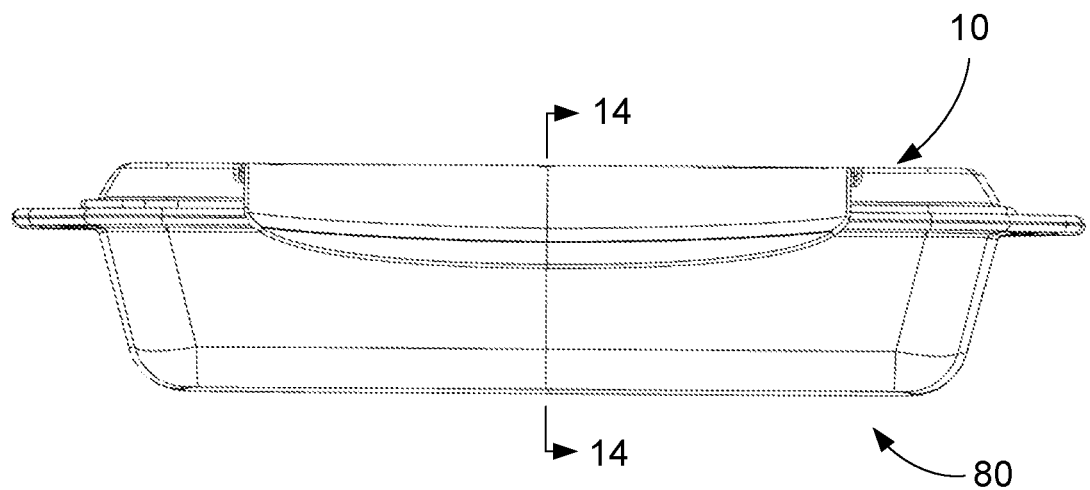
FIG. 13 is a right side view of the lid assembly secured to a container.
Figure 14:
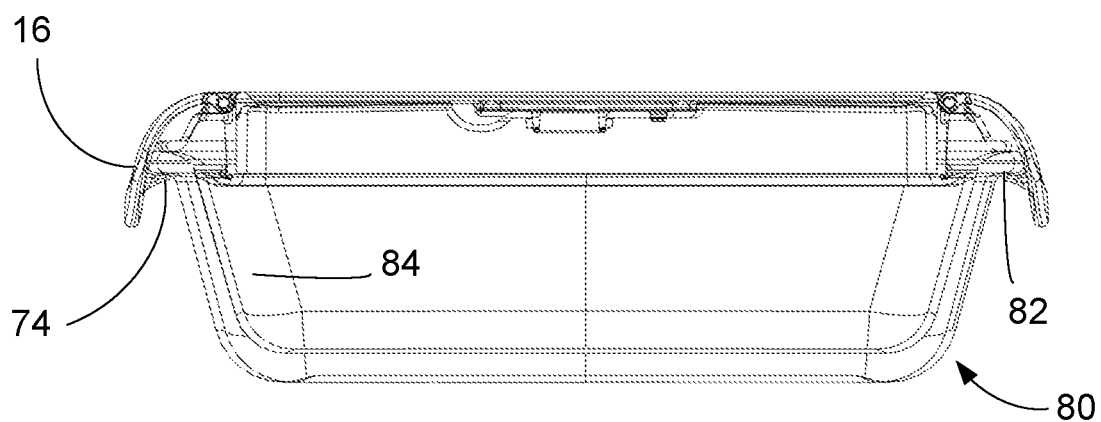
FIG. 14 is a cross-sectional view taken about line 14-14 in FIG. 13.
Figure 15:
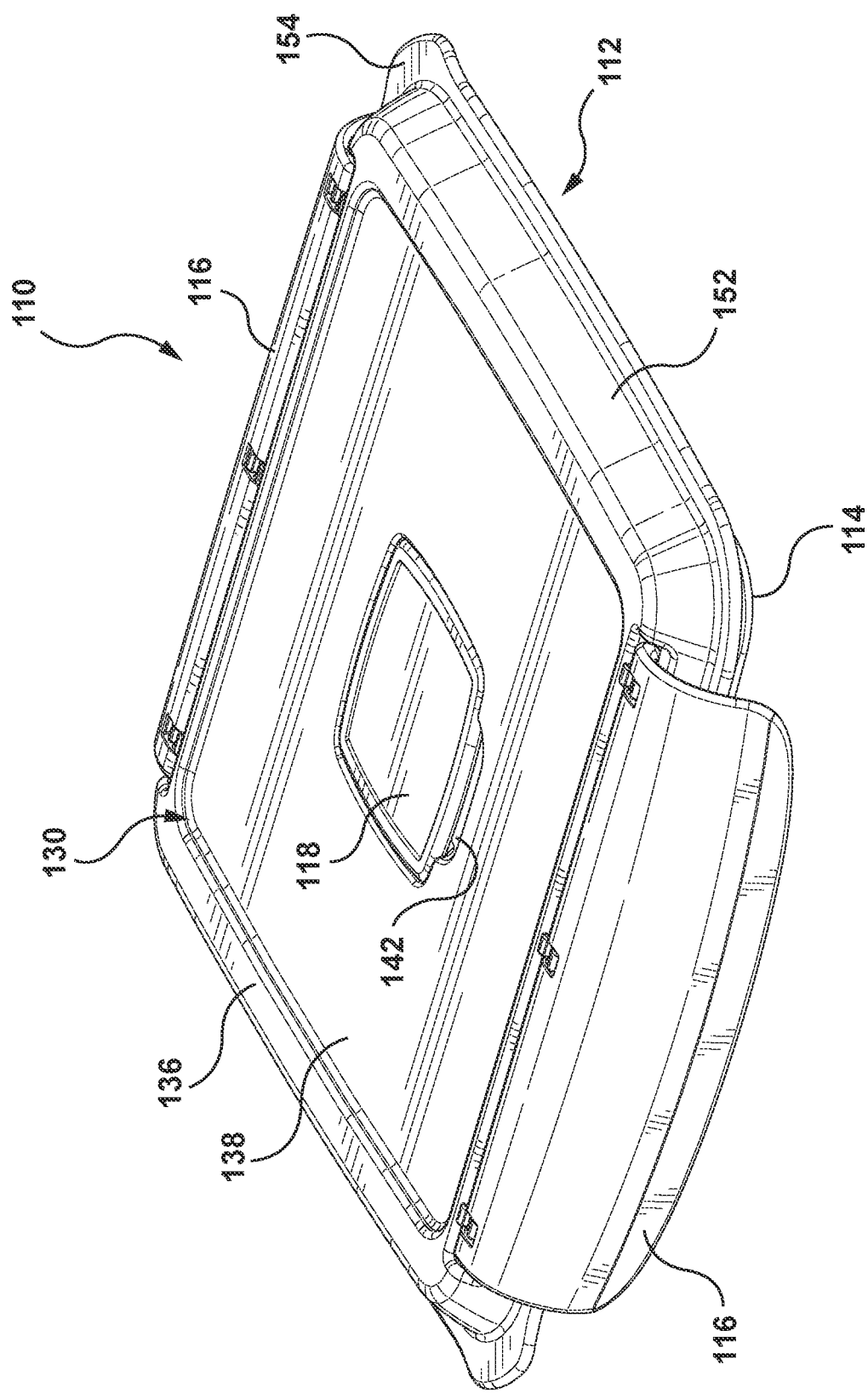
FIG. 15 is a top perspective view of another exemplary lid assembly.
Figure 16:
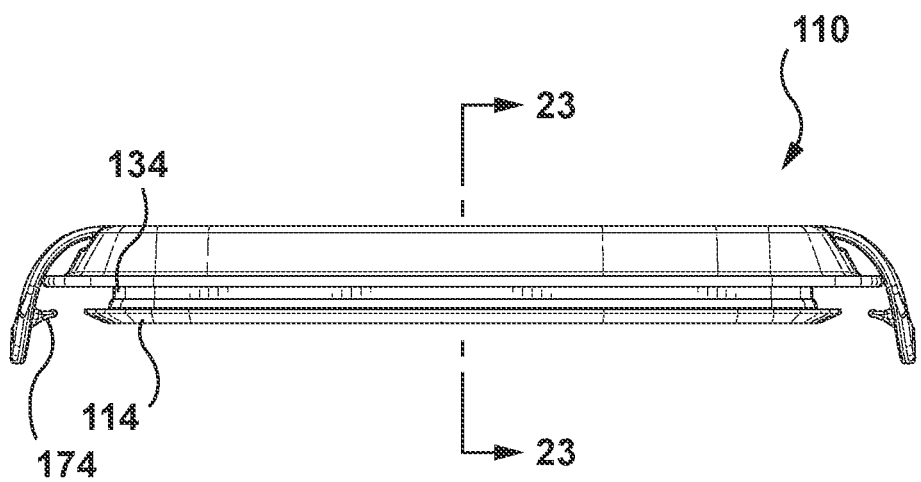
FIG. 16 is a front view of the lid assembly.
Figure 17:
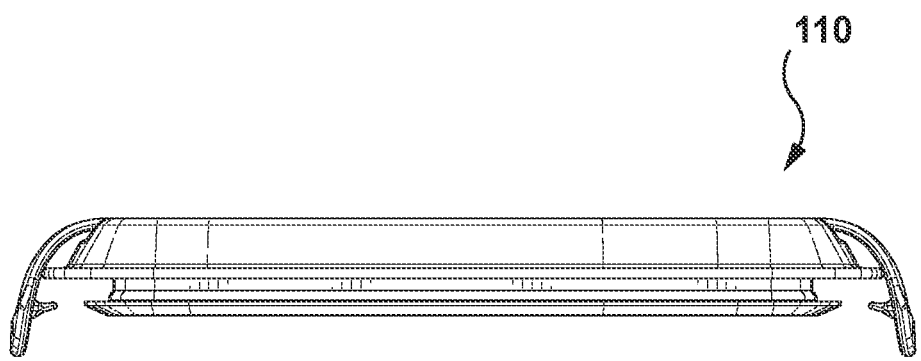
FIG. 17 is a rear view of the lid assembly.
Figure 18:
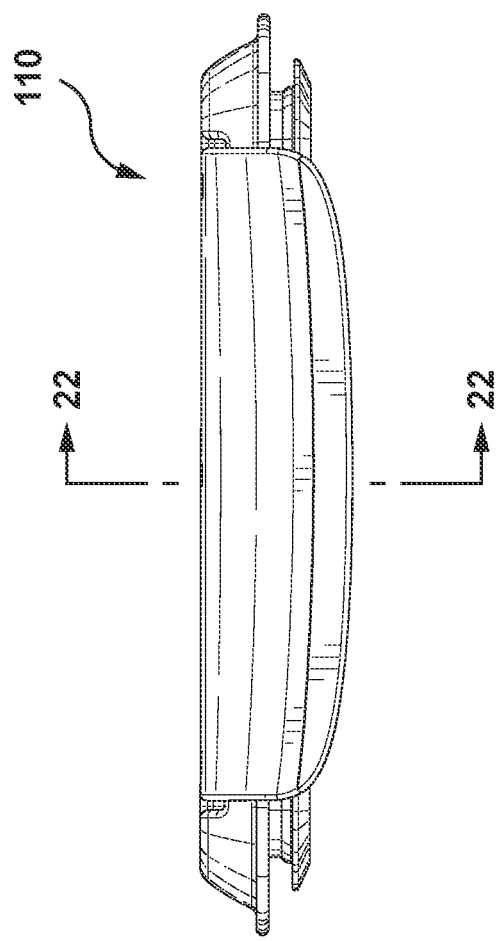
FIG. 18 is a right side view of the lid assembly.
Figure 19:
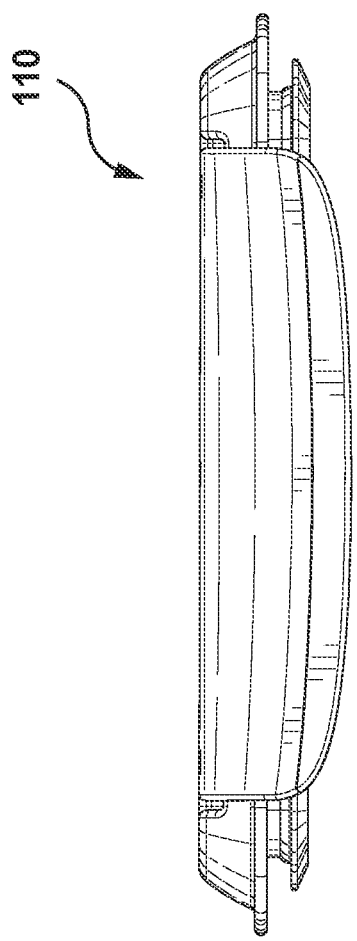
FIG. 19 is a left side view of the lid assembly.
Figure 20:
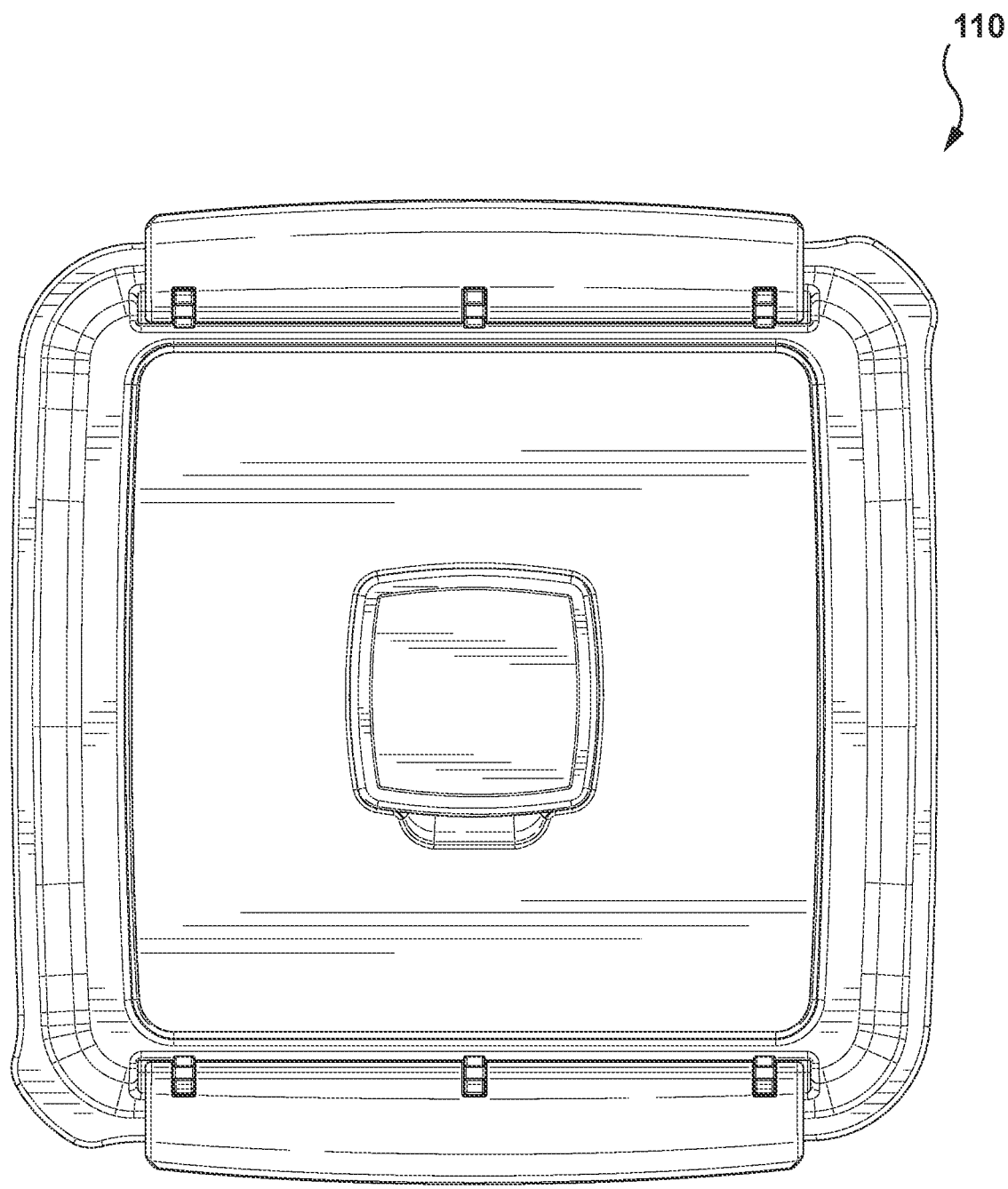
FIG. 20 is a top view of the lid assembly.
Figure 21:
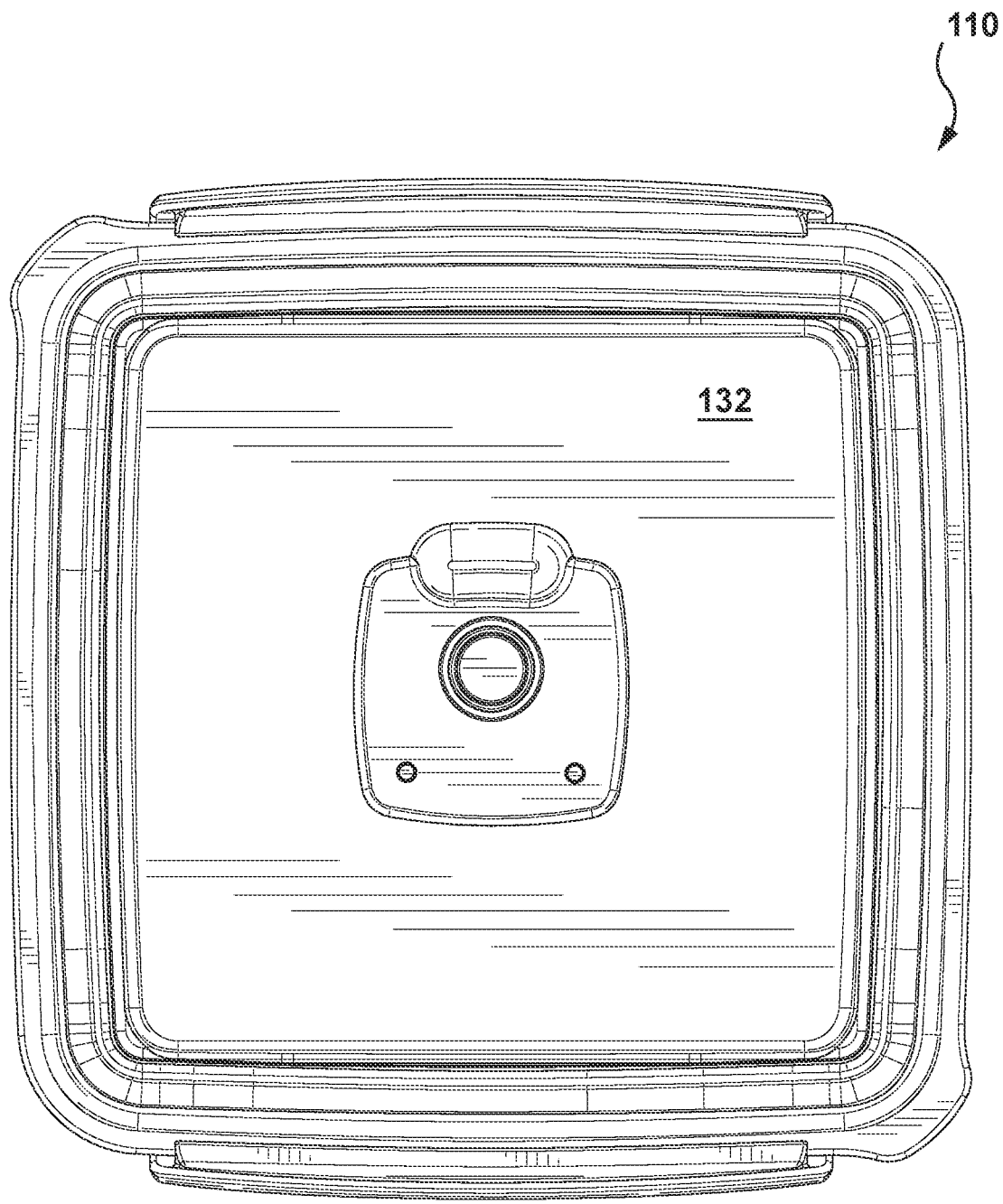
FIG. 21 is a bottom view of the lid assembly.
Figure 22:
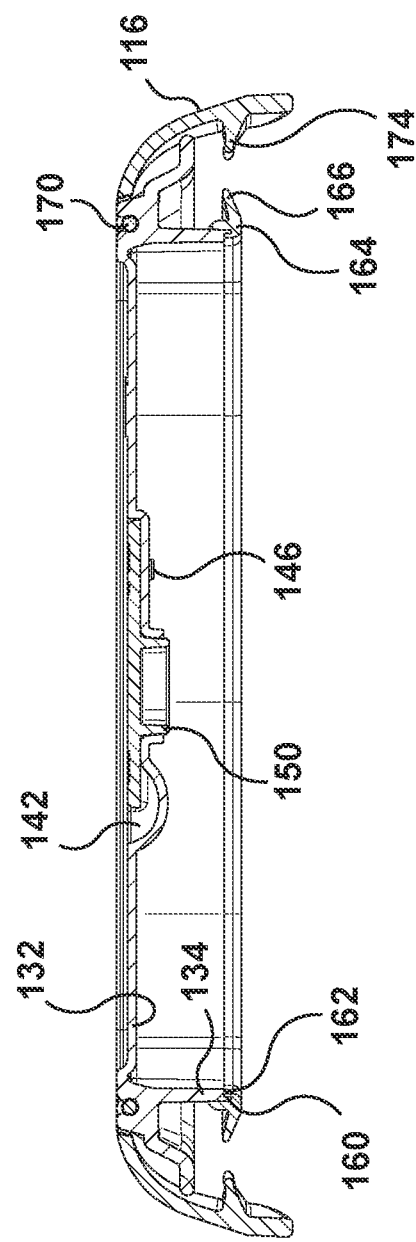
FIG. 22 is a cross-sectional view taken about line 22-22 in FIG. 18.
Figure 23:
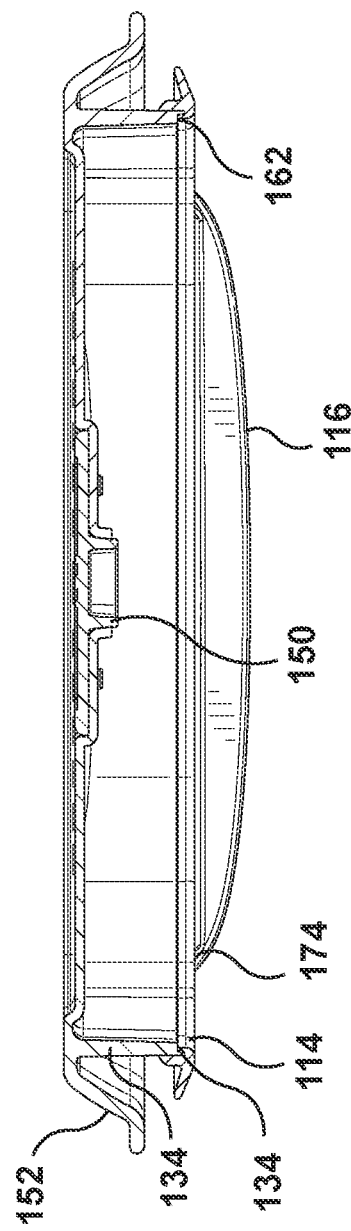
FIG. 23 is a cross-sectional view taken about line 23-23 in FIG. 16.
Figure 24:
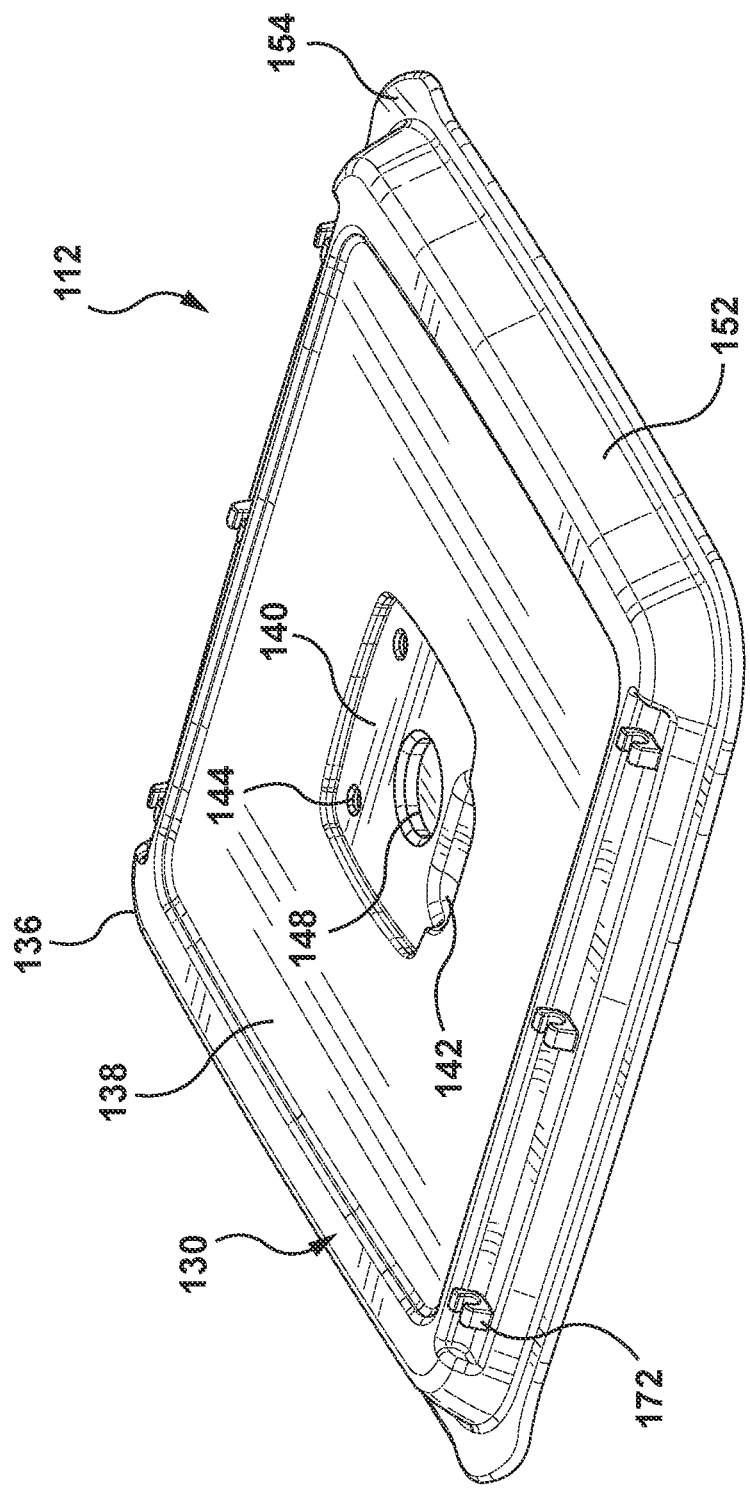
FIG. 24 is a top perspective view of a lid of the lid assembly.
Figure 25:
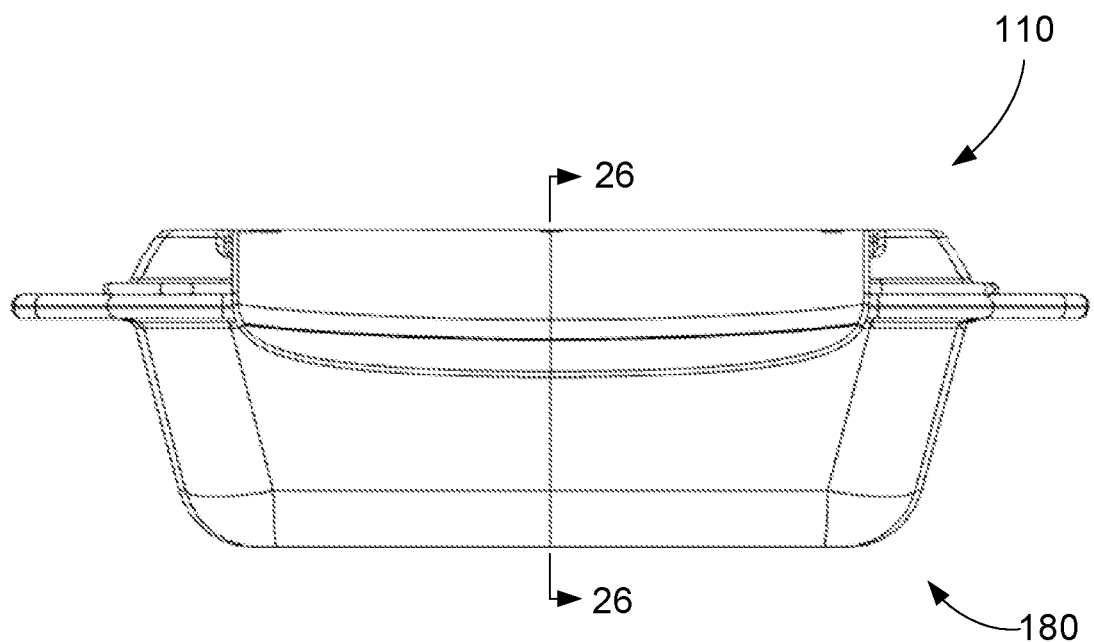
FIG. 25 is a front view of the lid assembly secured to a container.
Figure 26:
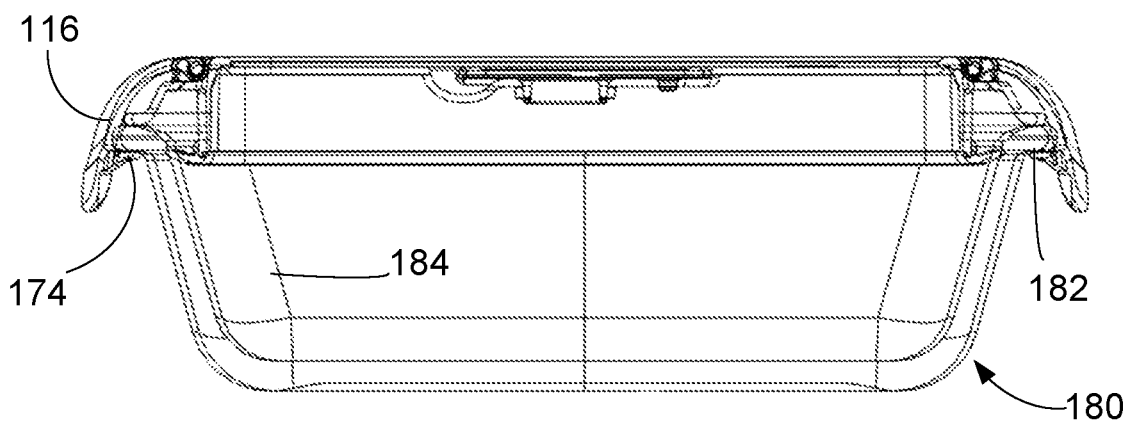
FIG. 26 is a cross-sectional view taken about line 26-26 in FIG. 25.

Referring additionally to FIGS. 12-14, the flaps 16 each include a plurality of pivot portions 70, and in the illustrated embodiment three pivot portions at a top of the flap 16 that removably engage with corresponding pivot portions 72 (FIG. 10) in the upper surface 30 of the lid 12. The pivot point of the flaps are provided at a top of the lid 12 to allow the flaps to lock to the container without the need for the container to have an additional locking feature to engage the flaps. The flaps each also include a radially inwardly extending clasp 74 extending along a length of the flaps 16 from an inner surface of the flap near a bottom of the flap 16. The at least two flaps 16 are movable between respective closed positions shown in FIGS. 13 and 14 where the clasps 74 engage an underside of a lip 82 of the container 80 to secure the lid assembly 10 to the container 80, and respective open positions where the clasps 74 are disengaged from the underside of the lip of the container 80.

To assembly the lid assembly 10 after the seal 14 has been formed on the lid 12, such as by molding, the flaps 16 and vent 18 are attached to the lid 12 in any suitable order. The pivot portions 70 on the flaps 16 are aligned with the corresponding pivot portions 72 on the lid 12 and pressed into the pivot portions 72 until the snap into position. The vent 18 is aligned with the second recessed area 40 and the bosses 46 inserted into the corresponding openings 44 and the protrusion 50 inserted into the opening 48 until the vent 18 is substantially flush with the first recessed area 38.

To attach the lid assembly 10 to the container 80, the flaps 16 are moved to their respective open positions and the lid positioned over the container to align a bottom of the edge 52 with the lip 82. The lid assembly 10 is then moved downward until the bottom of the edge 52 abuts the top of the lip 82. As the lid assembly 10 is moved downward, the sealing lip 66 is compressed by the inner surface 84 of the container 80 to create an airtight seal with the container 80. Once the lid assembly 10 is positioned, the flaps 16 are moved downward to their closed position where the clasps 74 engage an underside of the lip 82 to hold the lid assembly 10 to the container. The design of the lid assembly 10 allows for a seal between the lid assembly and the container despite the tolerances of the material of the container, such as with soda-lime glass.

Turning now to FIGS. 15-26, an exemplary embodiment of the lid assembly is shown at 110. The lid assembly 110 is substantially the same as the above-referenced lid assembly 10, and consequently the same reference numerals but indexed by 100 are used to denote structures corresponding to similar structures in the lid assemblies. In addition, the foregoing description of the lid assembly 10 is equally applicable to the lid assembly 110 except as noted below.

The lid assembly 110 includes a lid 112, a seal 114 integrally formed with the lid 112, at least two flaps 116 pivotally connected to the lid 112, and a vent 118 removable attached to the lid 112. The lid may be any suitable size, such as one sized to attach to an eight by eight container. The lid 112 has an upper surface 130, a lower surface 132, and a projection 134 extending downward from and around the lower surface 132. The upper surface 130 includes a first area 136, a first recessed area 138, and a second recessed area 140 recessed relative to the first recessed area 138 for receiving the vent 118. Provided in the second recessed area is an indent 142 for a user's fingers that allows a user to grasp an underside of the vent 118, one or more openings 144 for receiving bosses 146 on the vent 118, and an opening 148 for receiving a protrusion 150 on the vent 118. The lid 112 also has an edge 152 projecting downward and outward from the first area 136 to contact an upper surface of the container. The edge 152 includes one or more griping portions 154, such as two extending from opposite corners thereof, which extend beyond the upper surface of the container for a user to grasp to remove the lid.

The projection 134 extends downward from and entirely around the lower surface 132 to strengthen the lid, and the seal 114 is integrally formed with and extends entirely around the projection 134. A finger 160 projects downward from a bottom of the projection 134 and entirely around the projection 134 to define with the bottom of the projection 134 a ledge 162 inward of the finger 160 to assist in preventing separation of the seal from the projection. The seal 114 includes a body 164 integrally formed with the projection 134 and a radially outwardly extending flexible lip 166 projecting radially outwardly from the body 164 for sealing against an inner surface 184 of a container 180.

The flaps 116 each include a plurality of pivot portions 170, and in the illustrated embodiment three pivot portions at a top of each flap 116 that removably engage with corresponding pivot portions 172 in the upper surface 130 of the lid 112. The flaps 116 each also include a radially inwardly extending clasp 174 extending along a length of the flaps 116 from an inner surface of the flap near a bottom of the flap 116. The at least two flaps 116 are movable between respective closed positions where the clasps 174 engage an underside of a lip 182 of the container 180 to secure the lid assembly 110 to the container 180, and respective open positions where the clasps 174 are disengaged from the underside of the lip of the container 180.

Figure 27:
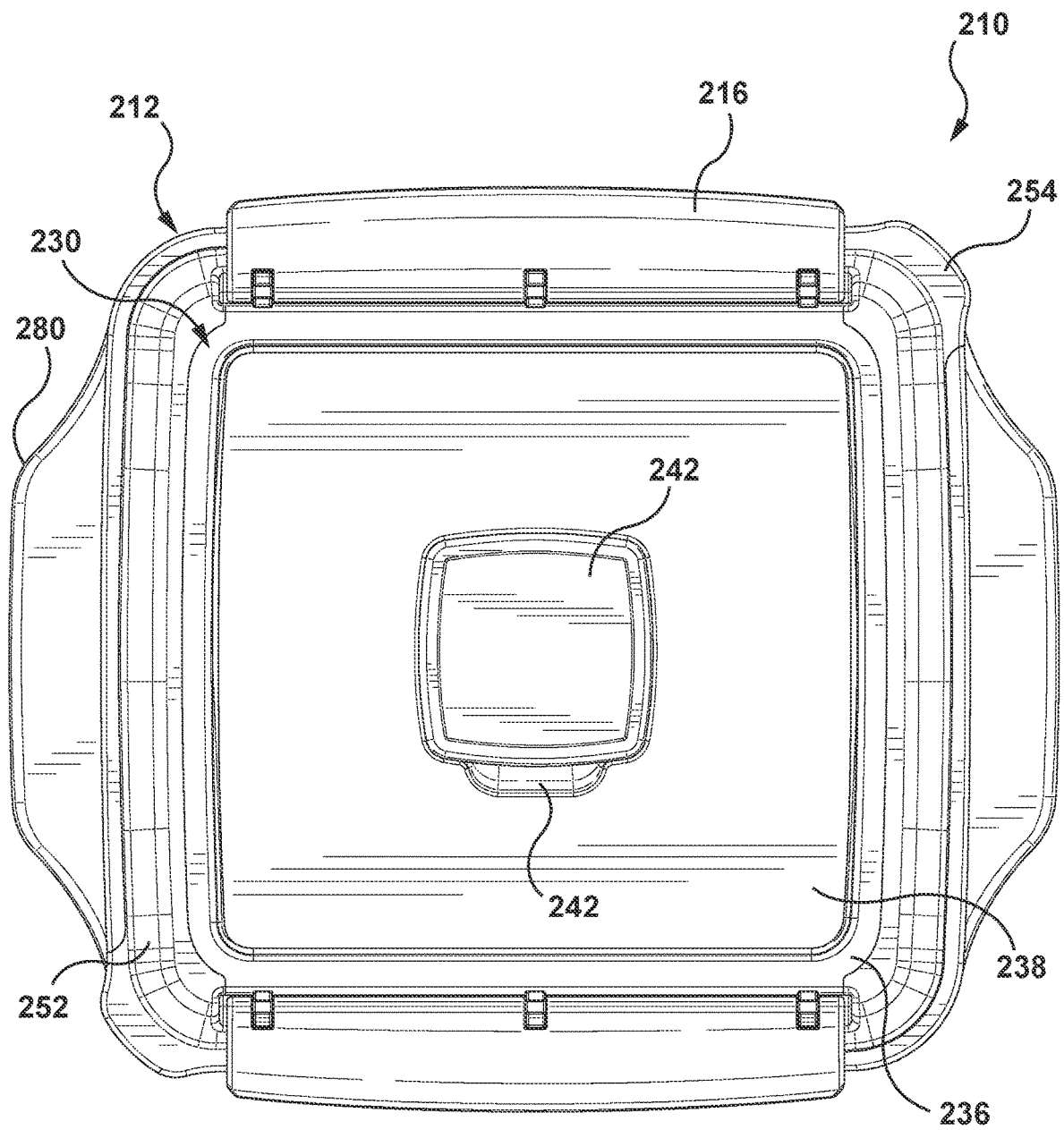
FIG. 27 is a top view of another exemplary lid assembly.
Figure 28:
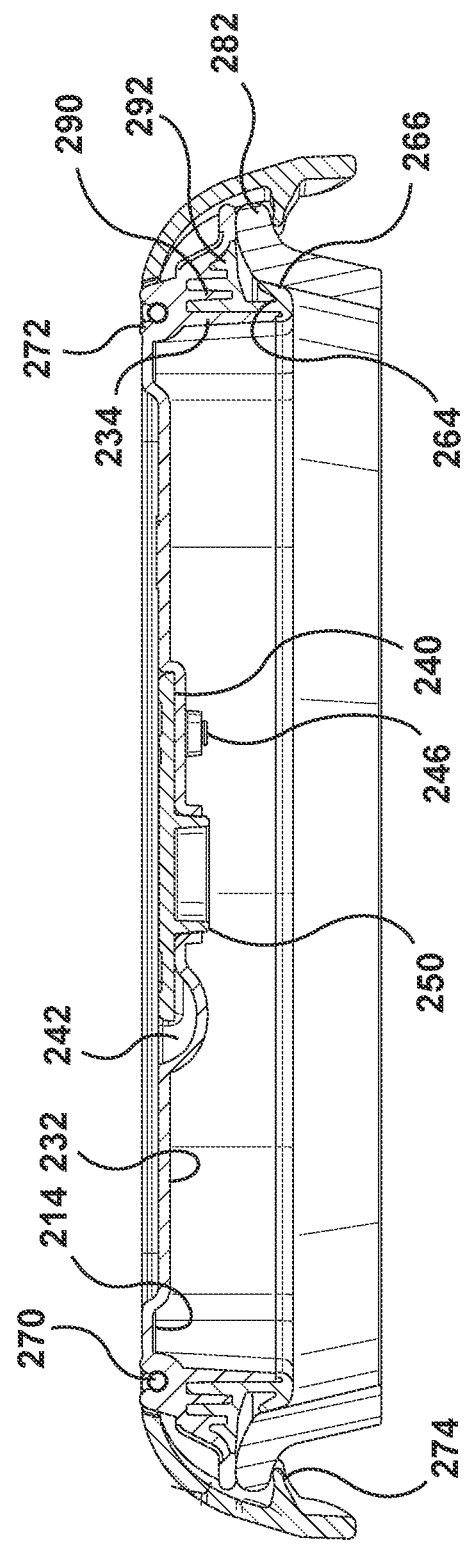
FIG. 28 is a cross-sectional view taken about line 28-28 in FIG. 27.
Figure 29:
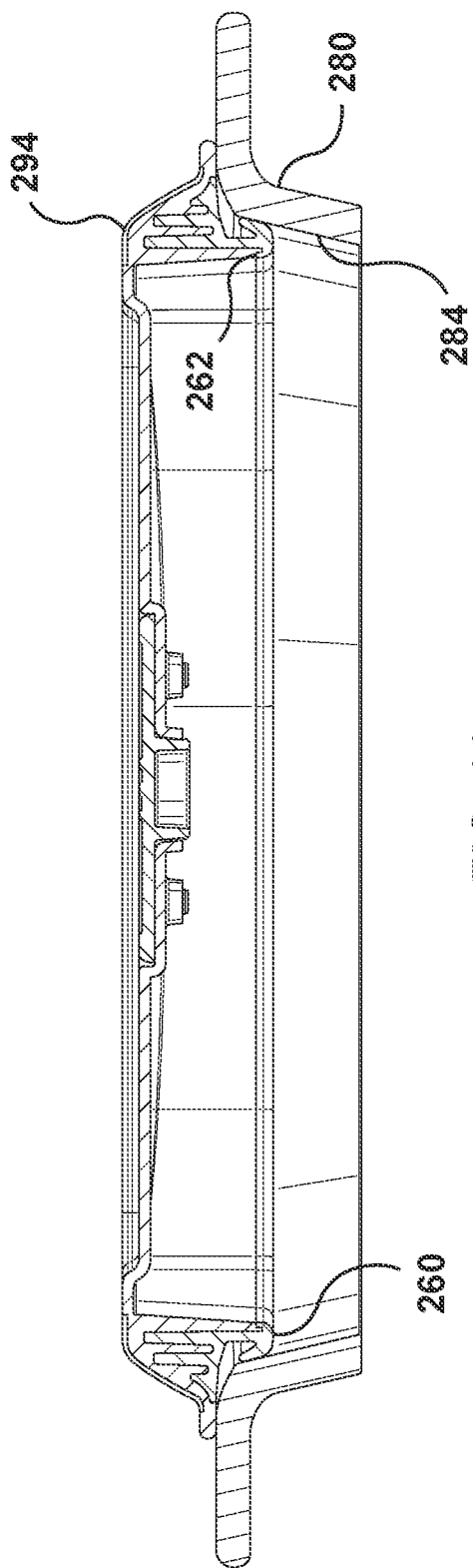
FIG. 29 is a cross-sectional view taken about line 29-29 in FIG. 27.
Figure 30:
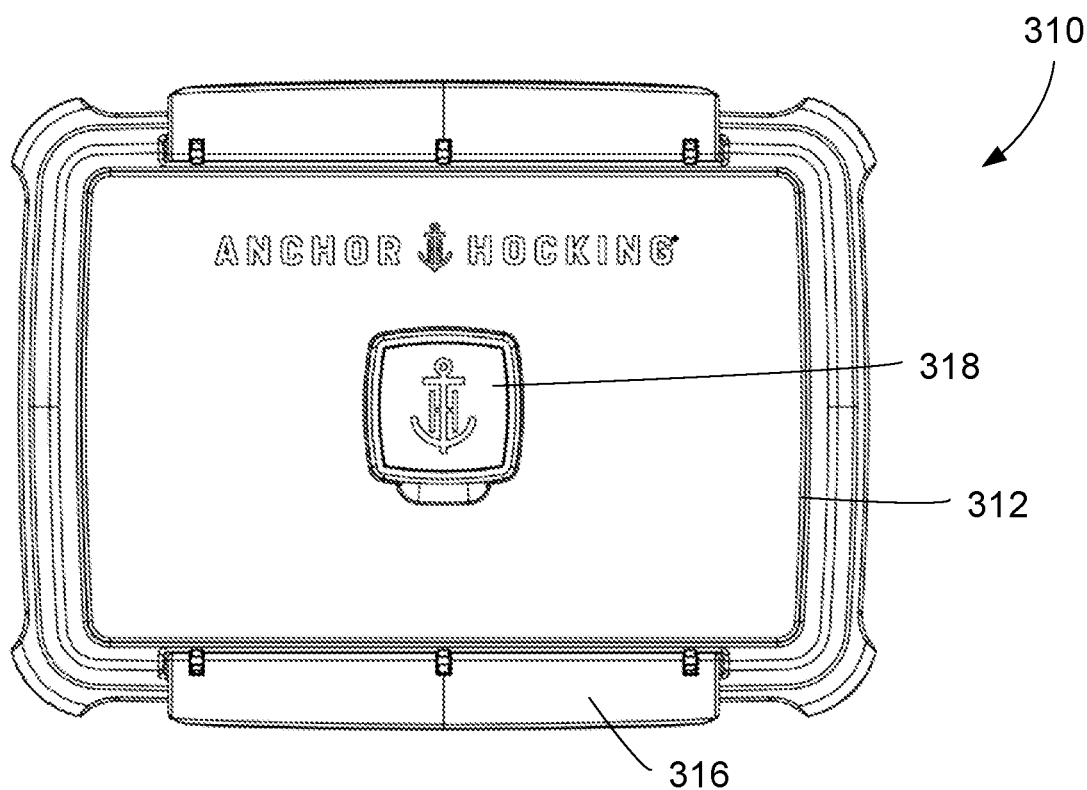
FIG. 30 is a top view of yet another exemplary lid assembly.
Figure 31:
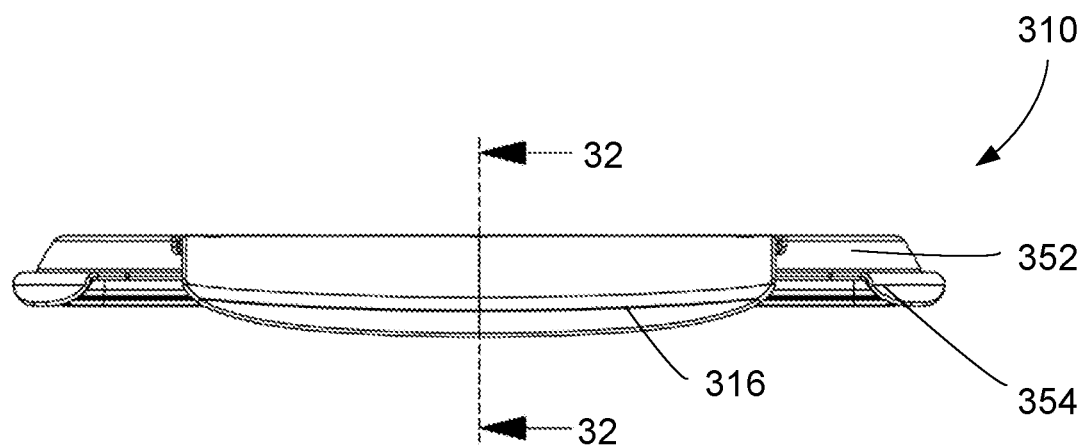
FIG. 31 is a front view of the lid assembly.
Figure 32:
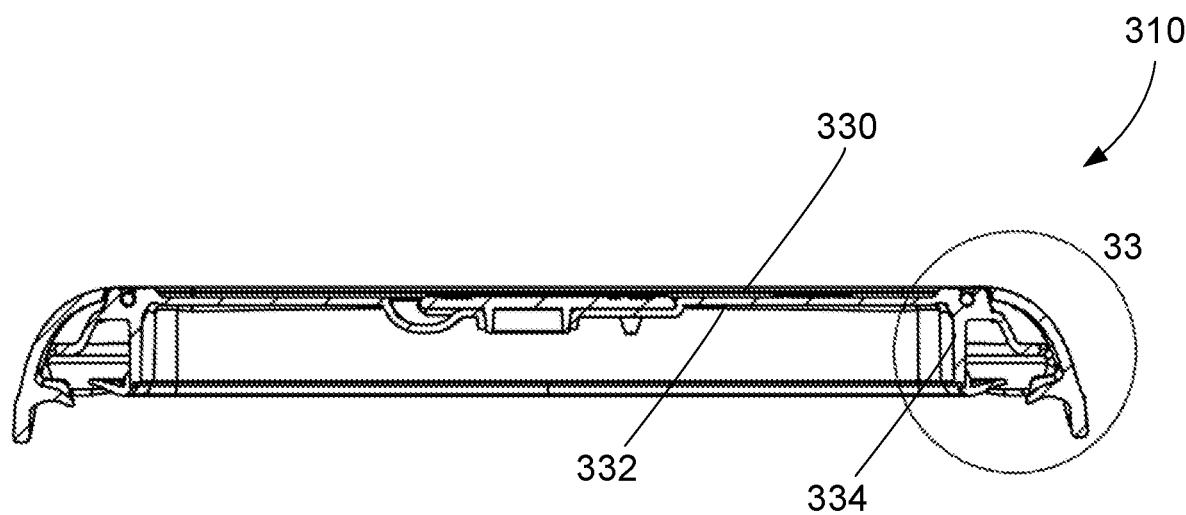
FIG. 32 is a cross-sectional view taken about line 32-32 in FIG. 31.
Figure 33:
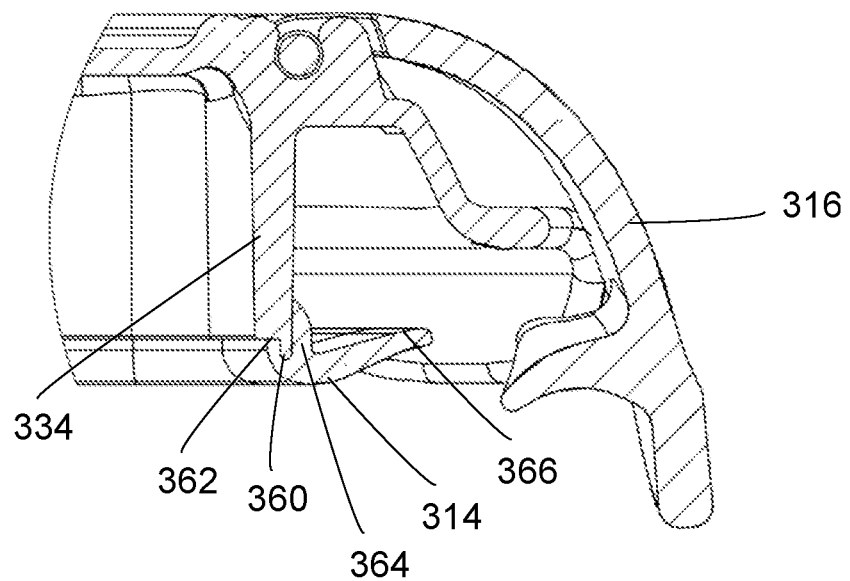
FIG. 33 is an enlarged view of detail 33 in FIG. 32.
Figure 34:
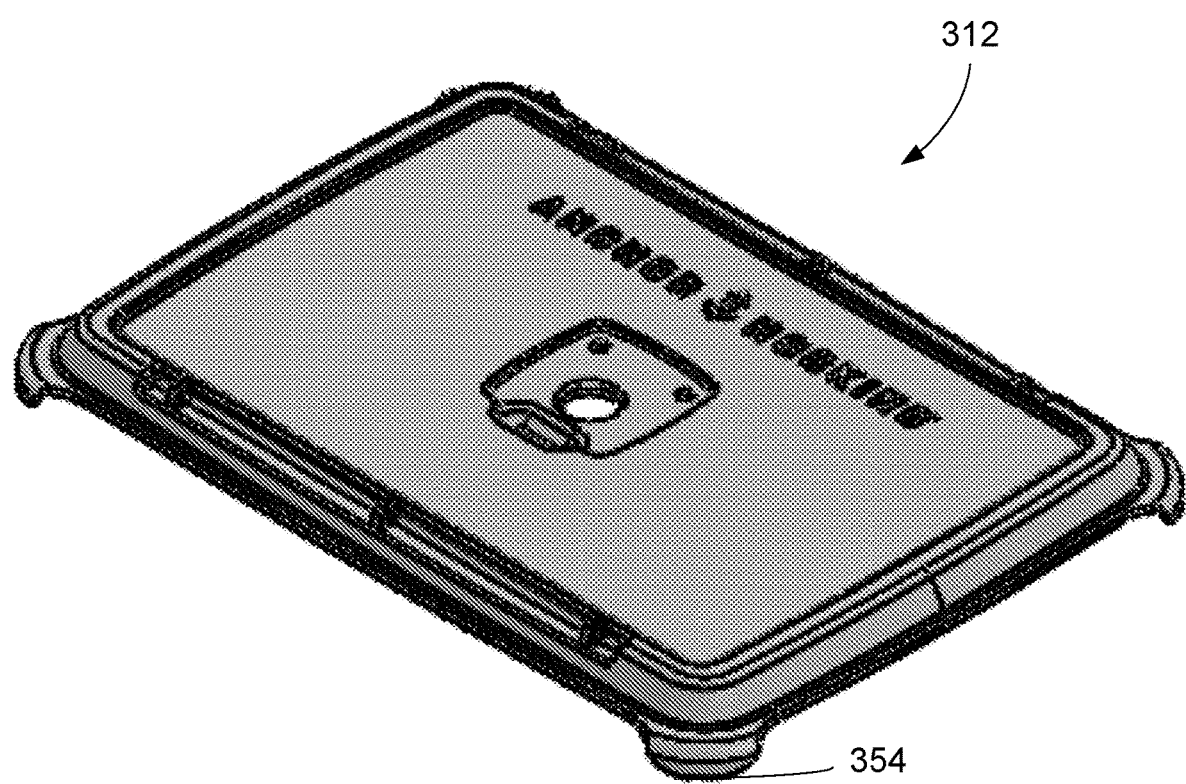
FIG. 34 is a perspective view of a lid of the lid assembly.
Figure 35:
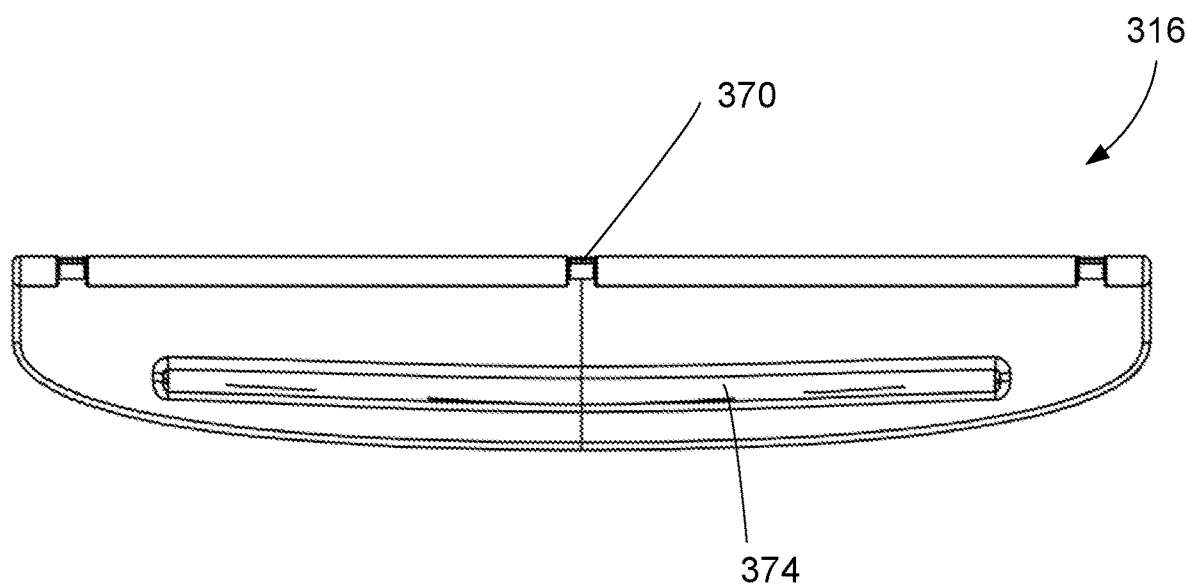
FIG. 35 is a rear view of a flap of the lid assembly.
Figure 36:
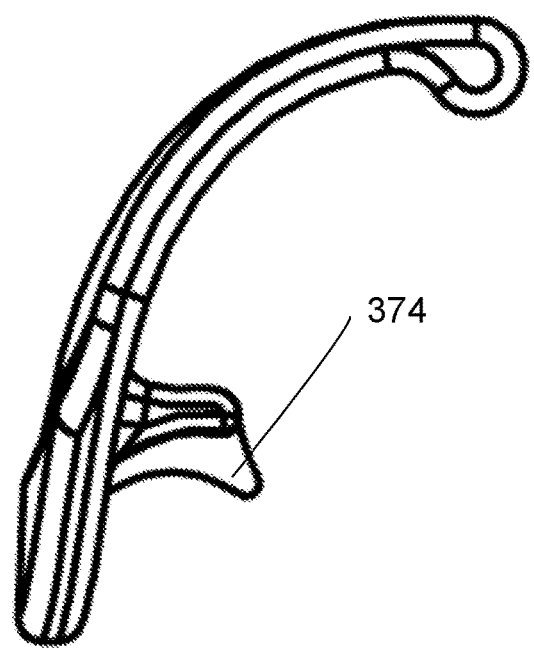
FIG. 36 is a side view of the flap.
Figure 37:
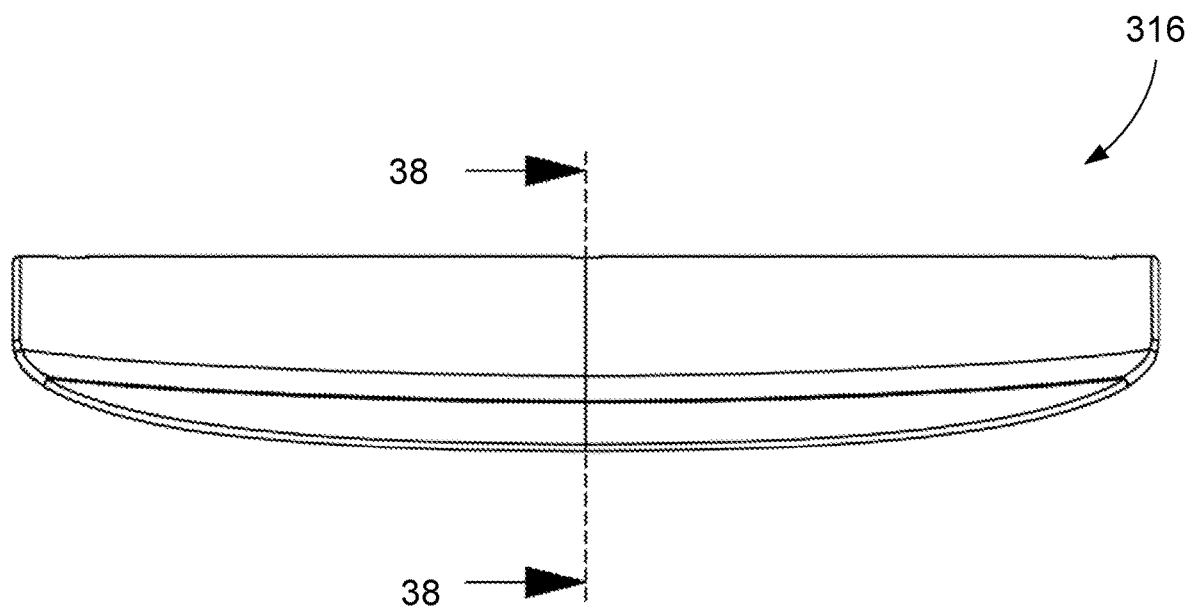
FIG. 37 is a front view of the flap.
Figure 38:
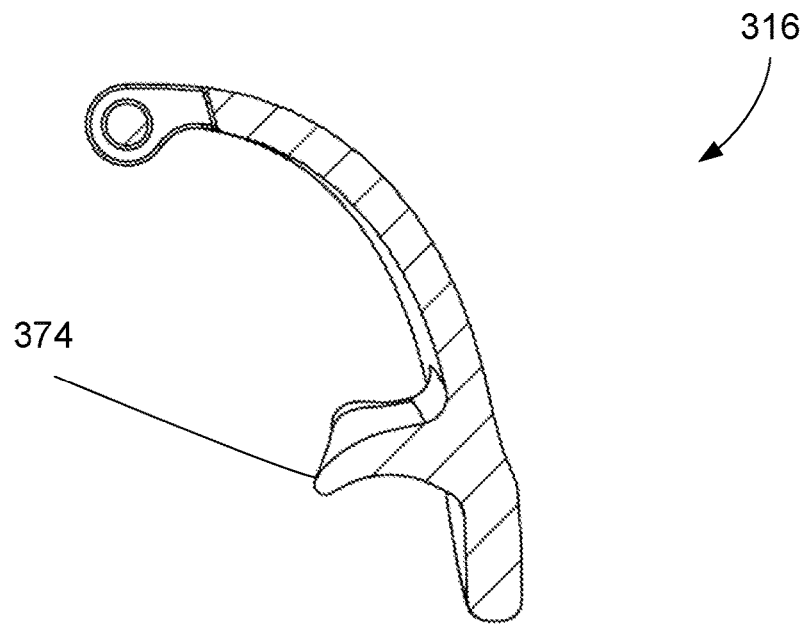
FIG. 38 is a cross-sectional view taken about line 38-38 in FIG. 37.
Figure 39:
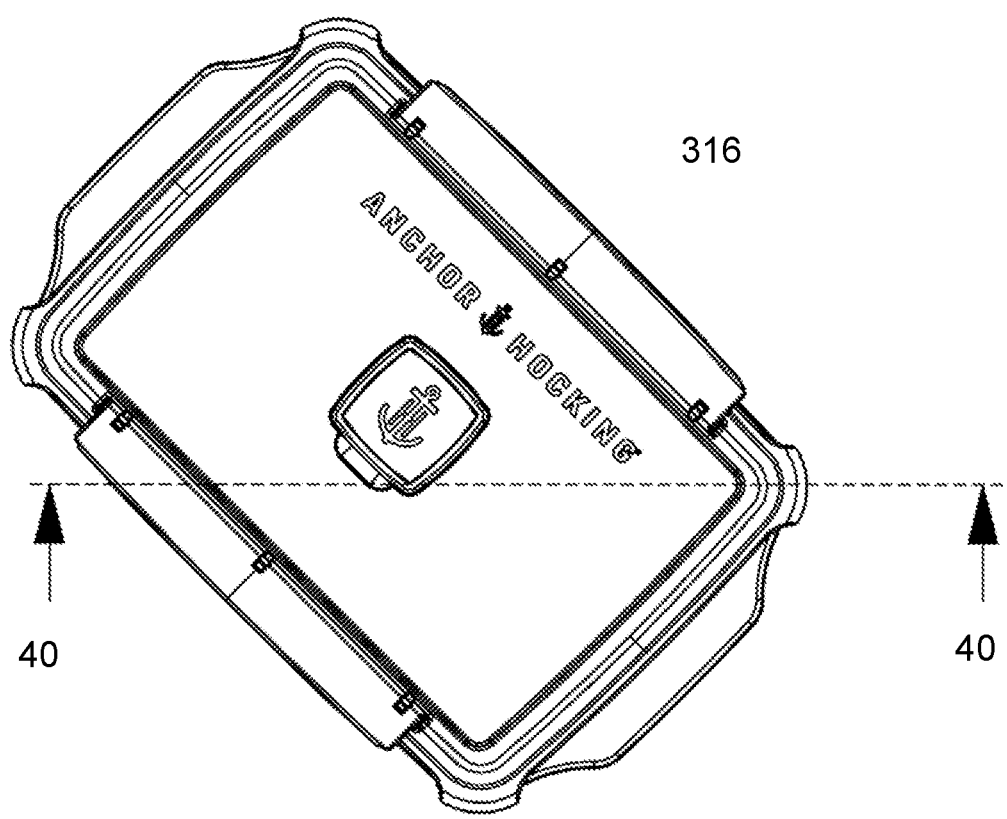
FIG. 39 is a top view of the lid assembly attached to a container.
Figure 40:
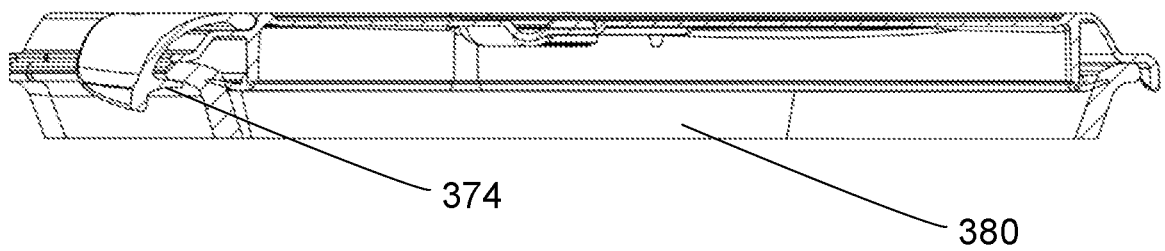
FIG. 40 is a cross-sectional view taken about line 40-40 in FIG. 39.
Figure 41:
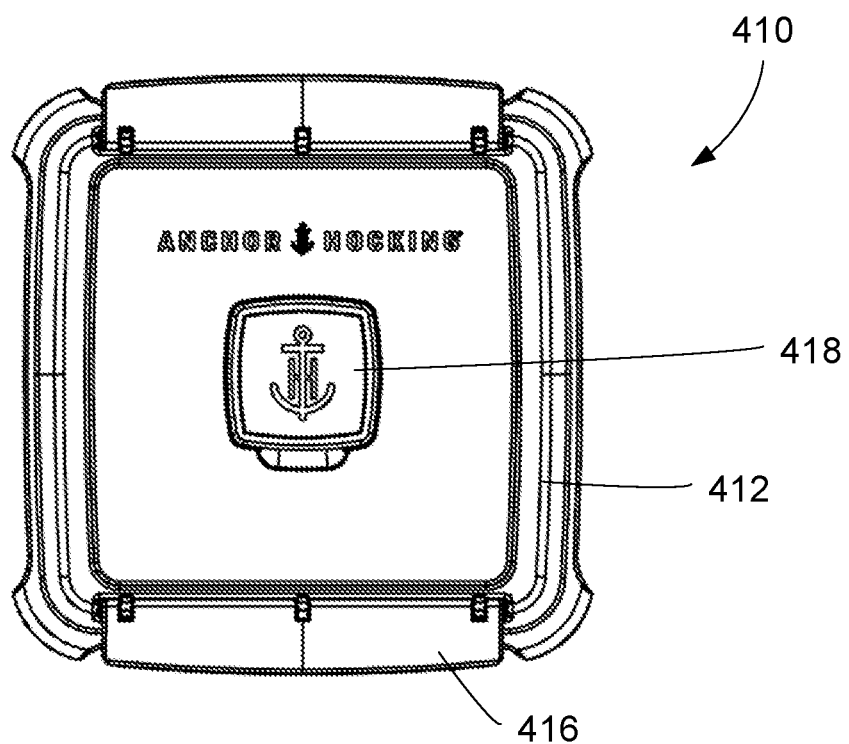
FIG. 41 is a top view of yet another exemplary lid assembly.
Figure 42:
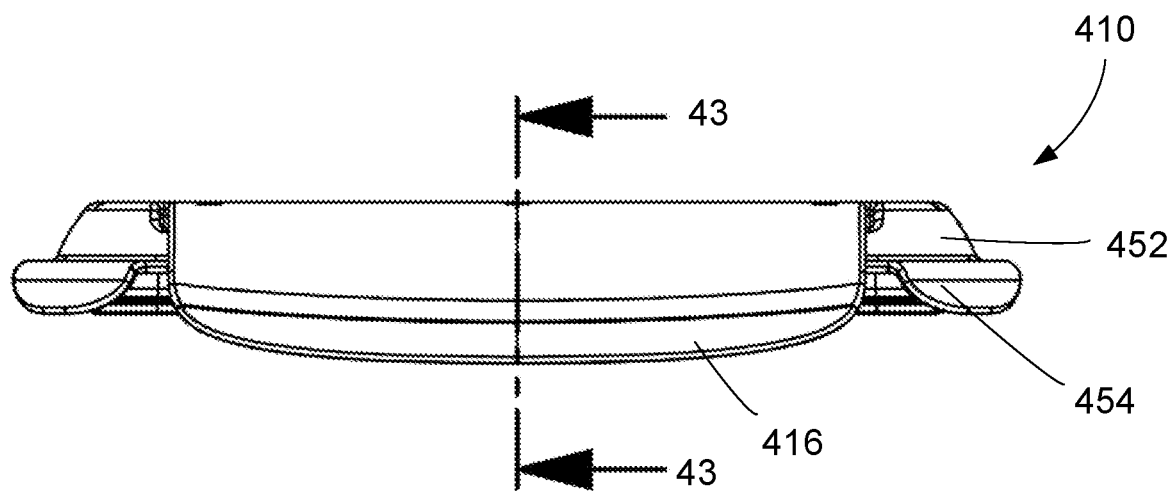
FIG. 42 is a front view of the lid assembly.
Figure 43:
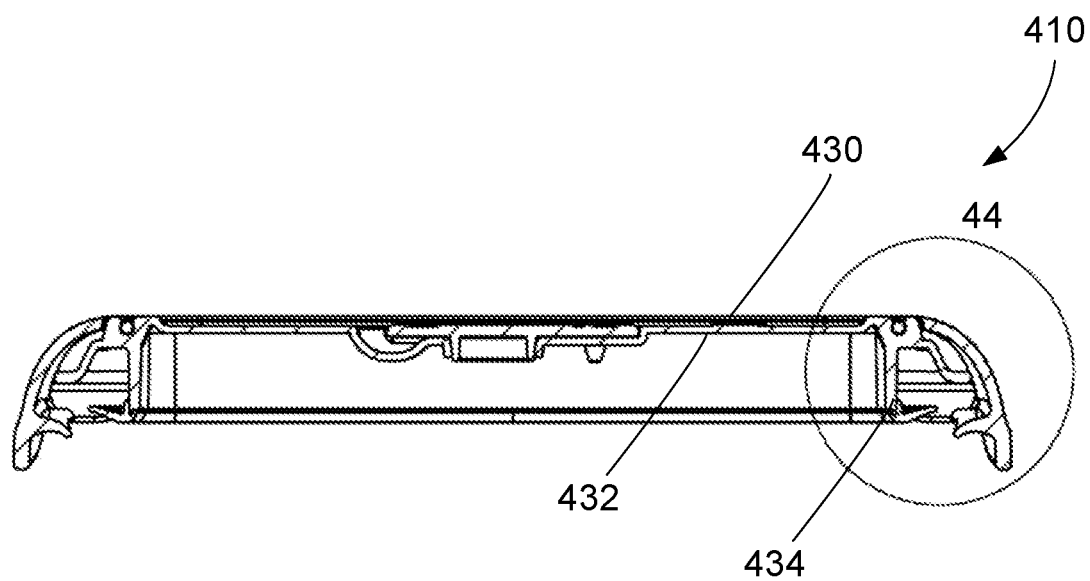
FIG. 43 is a cross-sectional view taken about line 43-43 in FIG. 42.
Figure 44:
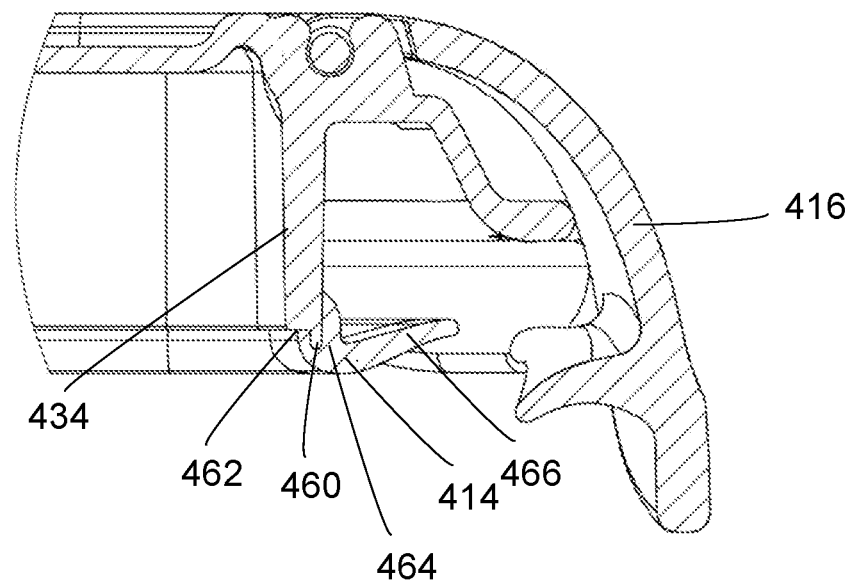
FIG. 44 is an enlarged view of detail 44 in FIG. 43.
Figure 45:
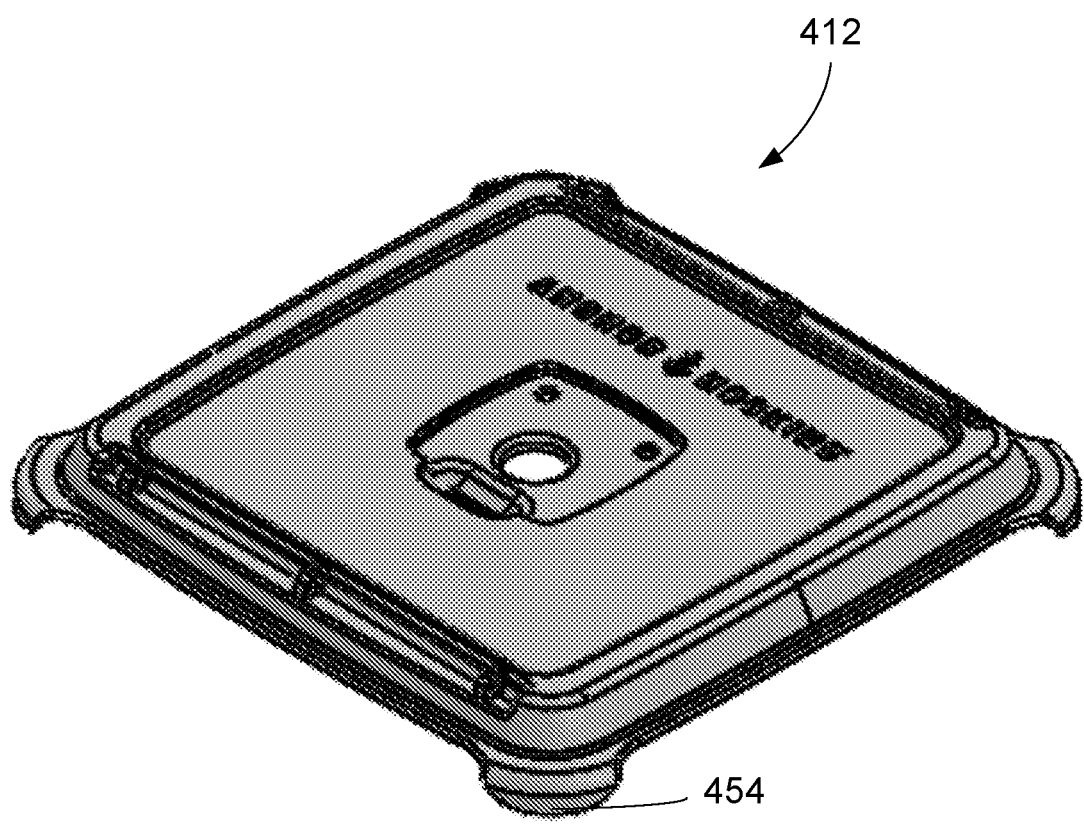
FIG. 45 is a perspective view of a lid of the lid assembly.
Figure 46:
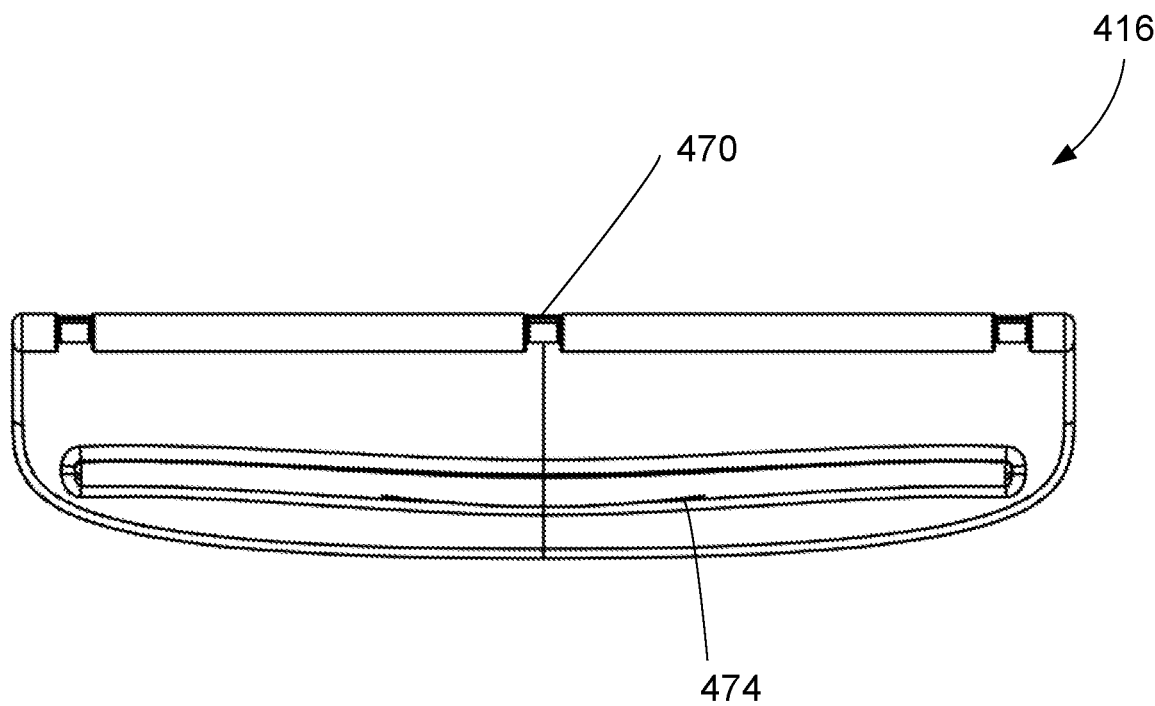
FIG. 46 is a rear view of a flap of the lid assembly.
Figure 47:
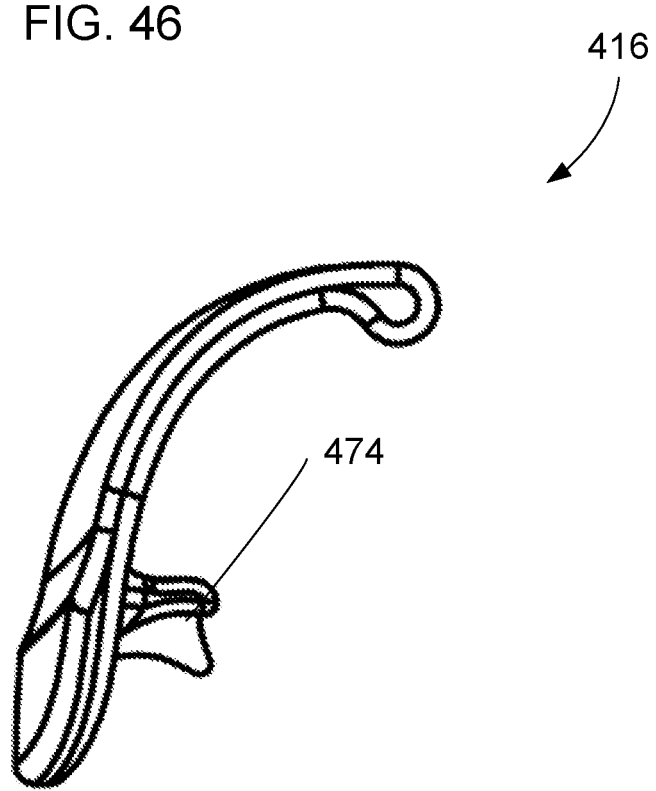
FIG. 47 is a side view of the flap.
Figure 48:
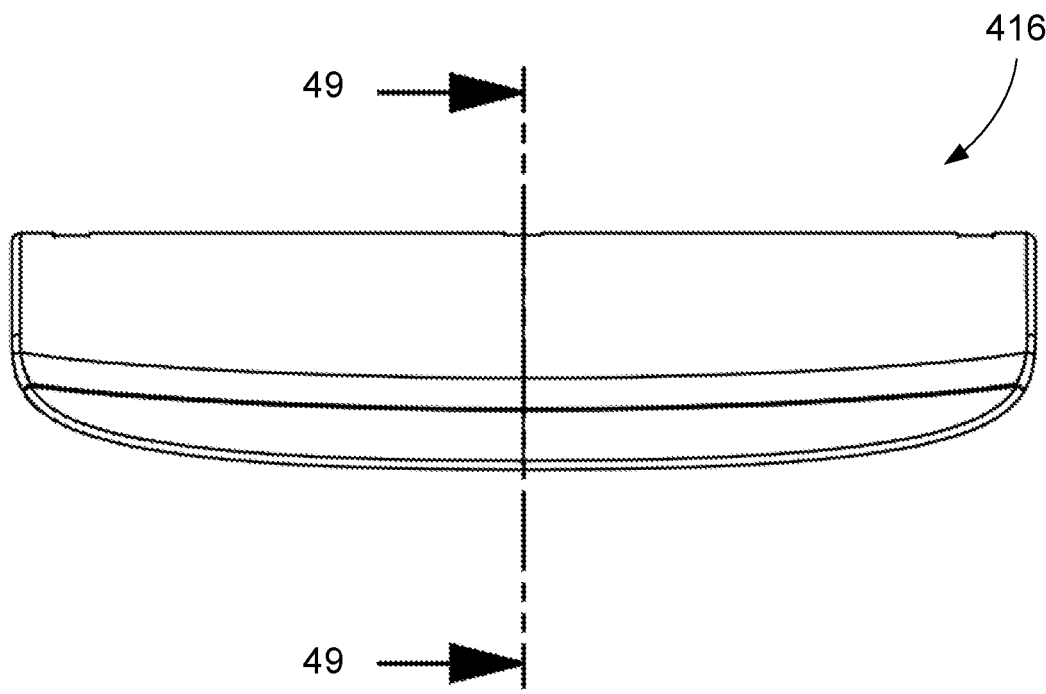
FIG. 48 is a front view of the flap.
Figure 49:
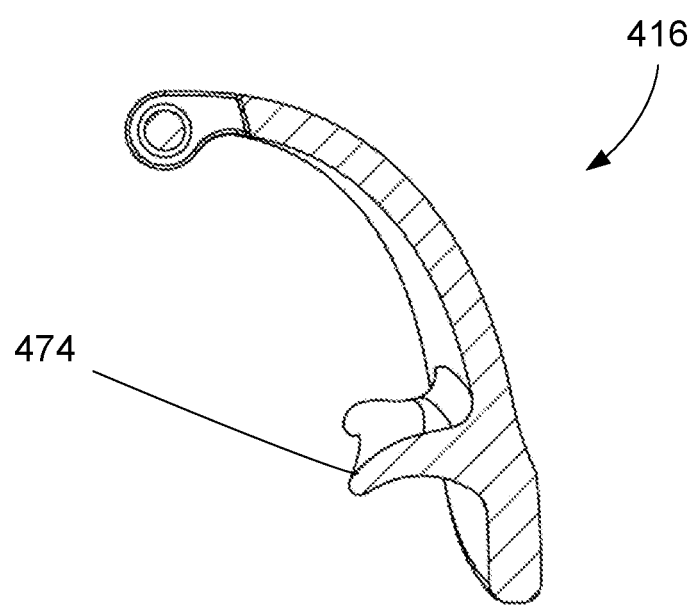
FIG. 49 is a cross-sectional view taken about line 49-49 in FIG. 48.

Turning now to FIGS. 27-29, an exemplary embodiment of the lid assembly is shown at 210. The lid assembly 210 is substantially the same as the above-referenced lid assembly 110, and consequently the same reference numerals but indexed by 100 are used to denote structures corresponding to similar structures in the lid assemblies In addition, the foregoing description of the lid assembly 110 is equally applicable to the lid assembly 210 except as noted below.

The lid assembly 210 includes a lid 212, a seal 214 integrally formed with the lid 212, at least two flaps 216 pivotally connected to the lid 212, and a vent 218 removable attached to the lid 212. The lid 212 has an upper surface 230, a lower surface 232, and a projection 234 extending downward from and around the lower surface 232. The upper surface 230 includes a first area 236, a first recessed area 238, and a second recessed area 240 recessed relative to the first recessed area 238 for receiving the vent 218. Provided in the second recessed area is an indent 242 for a user's fingers that allows a user to grasp an underside of the vent 218, one or more openings for receiving bosses 246 on the vent 218, and an opening for receiving a protrusion 250 on the vent 218. The lid 212 also has an edge 252 projecting downward and outward from the first area 236 to contact an upper surface of the container. The edge 252 includes one or more griping portions 254, such as two extending from opposite corners thereof, which extend beyond the upper surface of the container 280 for a user to grasp to remove the lid.

The projection 234 extends downward from and entirely around the lower surface 232 to strengthen the lid, and the seal 214 is integrally formed with and extends entirely around the projection 234. A finger 260 projects downward from a bottom of the projection 234 and entirely around the projection 234 to define with the bottom of the projection 234 a ledge 262 inward of the finger 260 to assist in preventing separation of the seal from the projection. The lid 212 additionally includes one or more additional projections 290, and as illustrated two projections 290 extending downward from and entirely around the lower surface 232 radially outwardly spaced from the projection 234, and the seal 214 is also integrally formed with and extends entirely around the projections 290. By increasing the number of projections, the thickness of the projection 234 can be reduced.

The seal 214 includes a body 264 integrally formed with the projection 234, a radially outwardly extending flexible lip 266 projecting radially outwardly from the body 264 for sealing against an inner surface 284 of the container 280, and a portion 292 projecting upward and radially outward from the body defining peaks between the projections 234 and 290. During molding of the seal 214 onto the lid 212, the seal material flows through openings (not shown) spaced around the periphery of the lid 212 such that the seal 212 is formed and is integral with a portion 294 on the upper surface 230 and ledge 252.

The flaps 216 each include a plurality of pivot portions 270, and in the illustrated embodiment three pivot portions at a top of each flap 216 that removably engage with corresponding pivot portions 272 in the upper surface 230 of the lid 212. The flaps 216 each also include a radially inwardly extending clasp 274 extending along a length of the flaps 216 from an inner surface of the flap near a bottom of the flap 216. The at least two flaps 216 are movable between respective closed positions where the clasps 274 engage an underside of a lip 282 of the container 280 to secure the lid assembly 210 to the container 280, and respective open positions where the clasps 274 are disengaged from the underside of the lip of the container 280.

Turning now to FIGS. 30-40, an exemplary embodiment of the lid assembly is shown at 110. The lid assembly 310 is substantially the same as the above-referenced lid assembly 10, and consequently the same reference numerals but indexed by 300 are used to denote structures corresponding to similar structures in the lid assemblies In addition, the foregoing description of the lid assembly 10 is equally applicable to the lid assembly 310 except as noted below.

The lid assembly 310 includes a lid 312, a seal 314 integrally formed with the lid 312, at least two flaps 316 pivotally connected to the lid 312, and a vent 318 removable attached to the lid 312. The lid 312 has an upper surface 330, a lower surface 332, and a projection 334 extending downward from and around the lower surface 332. The lid 312 also has an edge 352 projecting downward and outward from an area of the upper surface to contact an upper surface of the container. The edge 352 includes one or more griping portions 354, such as four gripping areas, one extending from each corner, which extend beyond the upper surface of the container to act as centering tabs for a user to grasp to remove the lid.

The projection 334 extends downward from and entirely around the lower surface 332 to strengthen the lid, and the seal 314 is integrally formed with and extends entirely around the projection 334. A finger 360 projects downward from a bottom of the projection 334 and entirely around the projection 334 to define with the bottom of the projection 334 a ledge 362 inward of the finger 360 to assist in preventing separation of the seal from the projection. The seal 314 includes a body 364 integrally formed with the projection 334 and a radially outwardly extending flexible lip 366 projecting radially outwardly from the body 364 for sealing against an inner surface of a container.

The flaps 316 each include a plurality of pivot portions 370, and in the illustrated embodiment three pivot portions at a top of each flap 316 that removably engage with corresponding pivot portions in the upper surface 330 of the lid 312. The flaps 316 each also include a radially inwardly extending clasp 374 extending along a length of the flaps 316 from an inner surface of the flap near a bottom of the flap 316. The at least two flaps 316 are movable between respective closed positions where the clasps 374 engage an underside of a lip of the container 380 to secure the lid assembly 310 to the container 380, and respective open positions where the clasps 374 are disengaged from the underside of the lip of the container. Each clasp 374 curves downward in a direction away from the pivot portions 370 when viewed in cross-section and also curves downward along its length from each side towards the middle of the clasp to securely engage the underside of the lip.

Turning now to FIGS. 41-49, an exemplary embodiment of the lid assembly is shown at 410. The lid assembly 410 is substantially the same as the above-referenced lid assembly 110, and consequently the same reference numerals but indexed by 300 are used to denote structures corresponding to similar structures in the lid assemblies In addition, the foregoing description of the lid assembly 110 is equally applicable to the lid assembly 410 except as noted below.

The lid assembly 410 includes a lid 412, a seal 414 integrally formed with the lid 412, at least two flaps 416 pivotally connected to the lid 412, and a vent 418 removable attached to the lid 412. The lid 412 has an upper surface 430, a lower surface 432, and a projection 434 extending downward from and around the lower surface 432. The lid 412 also has an edge 452 projecting downward and outward from an area of the upper surface to contact an upper surface of the container. The edge 452 includes one or more griping portions 454, such as four gripping areas, one extending from each corner, which extend beyond the upper surface of the container to act as centering tabs for a user to grasp to remove the lid.

The projection 434 extends downward from and entirely around the lower surface 432 to strengthen the lid, and the seal 414 is integrally formed with and extends entirely around the projection 434. A finger 460 projects downward from a bottom of the projection 434 and entirely around the projection 434 to define with the bottom of the projection 434 a ledge 462 inward of the finger 460 to assist in preventing separation of the seal from the projection. The seal 414 includes a body 464 integrally formed with the projection 434 and a radially outwardly extending flexible lip 466 projecting radially outwardly from the body 464 for sealing against an inner surface 484 of a container.

The flaps 416 each include a plurality of pivot portions 470, and in the illustrated embodiment three pivot portions at a top of each flap 416 that removably engage with corresponding pivot portions in the upper surface 430 of the lid 412. The flaps 416 each also include a radially inwardly extending clasp 474 extending along a length of the flaps 416 from an inner surface of the flap near a bottom of the flap 416. The at least two flaps 416 are movable between respective closed positions where the clasps 474 engage an underside of a lip of the container to secure the lid assembly 410 to the container 480, and respective open positions where the clasps 474 are disengaged from the underside of the lip of the container. Each clasp 474 curves downward in a direction away from the pivot portions 470 when viewed in cross-section and also curves downward along its length from each side towards the middle of the clasp to securely engage the underside of the lip.

The aforementioned systems, components, (e.g., containers, lid assemblies, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A lid assembly for a container comprising:
    a lid formed of a first material and having an upper surface, a lower surface, and a projection extending downward from and around the lower surface;
    a seal formed of a second material and integrally formed with and extending around the projection, the seal having a radially outwardly extending flexible lip for sealing against an inner surface of the container;
    at least two flaps pivotally and removably connected to the upper surface of the lid, each flap having a radially inwardly extending clasp; and
    a finger projecting downward from a bottom of the projection to define with the bottom of the projection a ledge,
    wherein the seal is formed with the projection covering the finger and abutting the ledge.

2. The lid assembly according to claim 1, wherein the projection is radially inwardly spaced from a downwardly projecting edge of the lid.

3. The lid assembly according to claim 1, wherein each clasp is curved downward in a direction away from the upper surface of the lid.

4. The lid assembly according to claim 3, wherein each clasp is also curved downward along its length from a first side toward a middle of the clasp and from a second side opposite the first side toward the middle.

5. The lid assembly according to claim 1, further including a vent removably attached to the lid, wherein the vent includes a pair of bosses projecting downward from a bottom surface of the vent configured to be received in corresponding openings in the lid, and a protrusion projecting downward from the bottom surface of the vent configured to be received in a corresponding opening in the lid.

6. The lid assembly according to claim 1, wherein the upper surface of the lid includes a first recessed area and a second recessed area recessed relative to the first recessed area, and wherein one or more openings extend through the second recessed area.

7. The lid assembly according to claim 6, further including a vent removably attached to the lid in the second recessed area.

8. The lid assembly according to claim 7, wherein the one or more openings includes first and second openings for receiving a respective boss projecting downward from a bottom surface of the vent and a third opening for receiving a protrusion projecting downward from the bottom surface of the vent.

9. The lid assembly according to claim 8, wherein an indent is provided in the second recessed area for a user to access an underside of the vent when the vent is disposed in the second recessed area to remove or pivot the vent.

10. The lid assembly according to claim 1, wherein the at least two flaps are formed of the second material.

11. A lid assembly for a container comprising:
a lid having an upper surface, a lower surface, a projection extending downward from and around the lower surface, and at least two pivot receptacles formed in the upper surface on opposite sides thereof;
a seal integrally formed with and extending around a bottom of the projection, the seal having a radially outwardly extending flexible lip for sealing against an inner surface of the container; and
at least two flaps each having at least one pivot removably connected to one of the at least two pivot receptacles, each flap having a radially inwardly extending clasp,
wherein the at least two flaps are movable between respective closed positions where the clasps engage an underside of a lip of the container to secure the lid assembly to the container and respective open positions where the clasps are disengaged from the underside of the container.

12. The lid assembly according to claim 11, further including a finger projecting downward from a bottom of the projection to define with the bottom of the projection a ledge, and wherein the seal surrounds the finger.

13. The lid assembly according to claim 11, wherein the projection is radially inwardly spaced from a downwardly projecting edge of the lid.

14. The lid assembly according to claim 11, wherein each flap includes a plurality of pivot portions spaced along a length of the flap, and wherein the lid includes a plurality of pivot portions spaced along a length of the lid on each side of the lid that receive a respective one of the plurality of pivot portions on the flap.

15. The lid assembly according to claim 11, further including a vent removably attached to the lid, wherein the vent includes a pair of bosses projecting downward from a bottom surface of the vent configured to be received in corresponding openings in the lid, and a protrusion projecting downward from the bottom surface of the vent configured to be received in a corresponding opening in the lid.

16. The lid assembly according to claim 11, wherein the upper surface of the lid includes a first recessed area and a second recessed area recessed relative to the first recessed area, and wherein one or more openings extend through the second recessed area.

17. The lid assembly according to claim 11, wherein each clasp is curved downward in a direction away from the upper surface of the lid.

18. The lid assembly according to claim 17, wherein each clasp is also curved downward along its length from a first side toward a middle of the clasp and from a second side opposite the first side toward the middle.

19. A container assembly comprising:
a container having an inner surface, an outer surface, and a lip at a top of the container; and
a lid assembly comprising:
a lid formed of a first material and having an upper surface, a lower surface that abuts the lip, and a projection extending downward from and around the lower surface;
a seal formed of a second material and integrally formed with and extending around the projection, the seal having a radially outwardly extending flexible lip that seals against the inner surface of the container; and
at least two flaps pivotally and removably connected to the upper surface of the lid, each flap having a radially inwardly extending clasp that engages the underside of the lip to secure the lid assembly to the container.

* * * * *